(12) United States Patent
Nakano et al.

(10) Patent No.: US 7,295,500 B2
(45) Date of Patent: Nov. 13, 2007

(54) RECORDING CONDITION SETTING METHOD AND INFORMATION RECORDER USING SAME

(75) Inventors: Masaki Nakano, Tokyo (JP); Toshiaki Iwanaga, Tokyo (JP); Tutomu Ichimura, Tokyo (JP)

(73) Assignee: NEC Corporation, Tokyo (JP)

( * ) Notice: Subject to any disclaimer, the term of this patent is extended or adjusted under 35 U.S.C. 154(b) by 466 days.

(21) Appl. No.: 10/503,070

(22) PCT Filed: Sep. 30, 2003

(86) PCT No.: PCT/JP03/12533

§ 371 (c)(1),
(2), (4) Date: Jan. 31, 2005

(87) PCT Pub. No.: WO2004/029944

PCT Pub. Date: Apr. 8, 2004

(65) Prior Publication Data

US 2005/0147007 A1    Jul. 7, 2005

(30) Foreign Application Priority Data

Sep. 30, 2002 (JP) .............................. 2002-287014

(51) Int. Cl.
*G11B 15/52* (2006.01)
(52) U.S. Cl. ............................... 369/47.53; 369/53.27; 369/53.31

(58) Field of Classification Search ................... None
See application file for complete search history.

(56) References Cited

U.S. PATENT DOCUMENTS

| 5,930,227 A | * | 7/1999 | Fujimoto et al. | ........ 369/53.35 |
| 6,611,481 B1 | * | 8/2003 | Koishi et al. | ............ 369/47.53 |
| 2004/0052178 A1 | * | 3/2004 | Saga | ....................... 369/47.53 |

FOREIGN PATENT DOCUMENTS

| JP | 07-249226 | 9/1995 |
| JP | 11-273076 | 10/1999 |
| JP | 2002-015479 | 1/2002 |
| JP | 2003-157534 | 5/2003 |
| WO | WO 01/78072 A1 | 10/2001 |

* cited by examiner

*Primary Examiner*—Paul W. Huber
(74) *Attorney, Agent, or Firm*—Muirhead and Saturnelli, LLC

(57) ABSTRACT

A test pattern including a first test mark which is one unit-record-length longer than a shortest mark among modulating codes and a second test mark which is two or more unit-record-lengths longer than the shortest mark is recorded under a plurality of recording conditions (step S2). The recorded test pattern is reproduced (step S3), and based on a plurality of reproduced signals thus obtained, recording conditions allowing the first test mark and the second test mark, respectively, to be suitably recorded are selected (step S4). A recording condition for the shortest mark is determined by inference based on the recording conditions of the first test mark and the second test mark.

23 Claims, 15 Drawing Sheets

- determine parameters — S11
- recording signals — S12
- measure signals — S13
- derive parameters for each record mark length — S14
- derive parameters for the shortest mark length — S15

| Ttop/Tcl(T) | Pw(%) -10 | -5 | default | +5 | +10 |
|---|---|---|---|---|---|
| -0.15 | | | | | |
| -0.10 | | | | | |
| -0.05 | | | | | |
| default | | | | | |
| +0.05 | | | | | |
| +0.10 | | | | | |
| +0.15 | | | | | |

- S21 determine parameters
- S22 record signal at a plurality of recording densities
- S23 measure the signal
- S24 derive parameters of each record mark for the plurality of recording densities
- S25 derive parameters for the higher recording density

FIG.12A

| Condition/item | Relative power | ≧4Ttop | 3Ttop | 2Ttop | ≧4Tmp | 3Tmp | ≧4Tcl | 3Tcl | 2Tcl | ≧4Tlp | 3Tlp |
|---|---|---|---|---|---|---|---|---|---|---|---|
| initial value | X1 | 0.60 | 0.50 | 0.40 | 0.50 | 0.50 | 0.25 | 0.21 | 0.17 | 0.5 | 0.5 |
| condition 11 | — | — | — | — | — | — | — | — | — | — | — |
| condition 12 | — | —0.05 | —0.05 | — | — | — | — | — | — | — | — |
| condition 13 | — | —0.10 | —0.10 | — | — | — | — | — | — | — | — |
| condition 14 | — | +0.05 | +0.05 | — | — | — | — | — | — | — | — |
| condition 15 | — | +0.10 | +0.10 | — | — | — | — | — | — | — | — |

FIG.12B

| Condition/item | Relative power | ≧4Ttop | 3Ttop | 2Ttop | ≧4Tmp | 3Tmp | ≧4Tcl | 3Tcl | 2Tcl | ≧4Tlp | 3Tlp |
|---|---|---|---|---|---|---|---|---|---|---|---|
| initial value | X1 | 0.60 | 0.50 | 0.40 | 0.50 | 0.50 | 0.25 | 0.21 | 0.17 | 0.5 | 0.5 |
| condition 21 | — | — | — | — | — | — | — | — | — | — | — |
| condition 22 | — | —0.05 | — | — | — | — | — | — | — | — | — |
| condition 23 | — | —0.10 | — | — | — | — | — | — | — | — | — |
| condition 24 | — | +0.05 | — | — | — | — | — | — | — | — | — |
| condition 25 | — | +0.10 | — | — | — | — | — | — | — | — | — |

FIG.15A

| Condition/item | Relative power | ≧4Ttop | 3Ttop | 2Ttop | ≧4Tmp | 3Tmp | ≧4Tcl | 3Tcl | 2Tcl | ≧4Tlp | 3Tlp |
|---|---|---|---|---|---|---|---|---|---|---|---|
| initial value | X1 | 0.60 | 0.60 | 0.60 | 0.50 | 0.50 | 0.25 | 0.25 | 0.25 | 0.5 | 0.5 |
| condition 31 | — | — | — | — | — | — | — | — | — | — | — |
| condition 32 | — | — | — | −0.05 | — | — | — | — | — | — | — |
| condition 33 | — | — | — | −0.10 | — | — | — | — | — | — | — |
| condition 34 | — | — | — | +0.05 | — | — | — | — | — | — | — |
| condition 35 | — | — | — | +0.10 | — | — | — | — | — | — | — |

FIG.15B

| Condition/item | Relative power | ≧4Ttop | 3Ttop | 2Ttop | ≧4Tmp | 3Tmp | ≧4Tcl | 3Tcl | 2Tcl | ≧4Tlp | 3Tlp |
|---|---|---|---|---|---|---|---|---|---|---|---|
| initial value | X1 | 0.60 | 0.60 | 0.60 | 0.50 | 0.50 | 0.25 | 0.25 | 0.25 | 0.5 | 0.5 |
| condition 41 | — | — | — | — | — | — | — | — | — | — | — |
| condition 42 | — | — | −0.05 | — | — | — | — | — | — | — | — |
| condition 43 | — | — | −0.10 | — | — | — | — | — | — | — | — |
| condition 44 | — | — | +0.05 | — | — | — | — | — | — | — | — |
| condition 45 | — | — | +0.10 | — | — | — | — | — | — | — | — |

FIG.15C

| Condition/item | Relative power | ≧4Ttop | 3Ttop | 2Ttop | ≧4Tmp | 3Tmp | ≧4Tcl | 3Tcl | 2Tcl | ≧4Tlp | 3Tlp |
|---|---|---|---|---|---|---|---|---|---|---|---|
| initial value | X1 | 0.60 | 0.60 | 0.60 | 0.50 | 0.50 | 0.25 | 0.25 | 0.25 | 0.5 | 0.5 |
| condition 51 | — | — | — | — | — | — | — | — | — | — | — |
| condition 52 | — | −0.05 | — | — | — | — | — | — | — | — | — |
| condition 53 | — | −0.10 | — | — | — | — | — | — | — | — | — |
| condition 54 | — | +0.05 | — | — | — | — | — | — | — | — | — |
| condition 55 | — | +0.10 | — | — | — | — | — | — | — | — | — | record data reproduced waveform shortest mark length: 0.166 μm shortest mark length 0.148 μm shortest mark length 0.125 μm

RECORDING CONDITION SETTING METHOD AND INFORMATION RECORDER USING SAME

TECHNICAL FIELD

The present invention relates to a recording condition setting method, an information recording device using the same and a program and, more particularly, to a recording condition setting method for suitably forming a plurality of record marks including a record mark near the optical diffraction limit, an information recording device using the same and a program.

BACKGROUND TECHNOLOGY

In recent years, large-capacity optical disks represented by DVD etc. are widely used. Upon recording information on the optical disk, an information-recording optical disk drive is used to focus a recording laser beam onto the information recording surface of the optical disk to form record marks thereon. Upon reproducing the information from the optical disk, information-reproducing optical disk drive is used to focus a reproducing laser beam onto the information recording surface of the optical disk to detect the reflected beam modulated by the record marks to reproduce the information. The optical disk allows the recorded information to be reproduced by another optical disk drive other than the optical disk drive that has recorded so long as the another optical disk drive is directed to the optical disk having the same specification.

Techniques for recording information onto the optical disk are categorized into two types including a mark position recording technique which allows the position of the record mark to have the information, and a mark edge recording technique which allows the front edge and rear edge of the record mark to have the information. Comparing both the techniques with each other, although the mark edge recording technique is suited to a higher recording density, the length of the record mark must be controlled with particularly higher accuracy.

In a rewritable optical disk, the record mark is generally formed by a temperature rise of the recording film due to irradiation of the laser beam. The length of the record mark changes depending on the disk configurations such as pigments or metals used in the optical disk and the track pitch, as well as the conditions such as the recording clock and the linear velocity. Accordingly, for controlling the record mark length with higher accuracy, it is necessary to suitably setting the recording condition including the pulse light intensity, pulse shape and pulse width (referred to as "recording strategy" hereinafter) of the laser beam irradiating the optical disk, depending on the configuration and linear velocity of the disk.

FIG. 17 shows waveform examples (a) to (d) of the laser output during forming record marks on the optical disk. Upon forming the record mark, the laser output is controlled based on one of the waveform patterns (a) to (d), to control the laser beam irradiating the recording surface of the optical disk. In the waveform (a), a laser beam having a constant output power is applied for the time length corresponding to the length of a record mark to form the record mark. In the waveform (b) and waveform (c), a pulse train including n or (n−1) pulses is used to form a record mark having a desired mark length. In the waveform (d), a non-pulse train having a higher laser output power corresponding to each of the front and rear edges of a record mark is used to form the record mark having a desired mark length and intensified front edge and rear edge.

In general, a record mark is formed to have a length which is an integral multiple of T, given T being a period of the clock (channel clock) used as a reference in the recording/reproducing operation. Each record mark is, for example, any one of the record marks having 2T to 8T lengths in a (1,7) RLL encoding scheme using a ⅔ conversion in the encoding. Here, 2T is constituted by a signal cycle including a space and a mark each having a length twice the period T of the channel clock, whereas 8T is constituted by a signal cycle including a space and a mark each having a length eight-time the period T of the channel clock.

In the optical disk drive, prior to recording on the optical disk, top width Ttop of the recording pulse, intermediate pulse width Tmp (or Tw), rear edge width Tlp of the recording pulse, rear edge cooling width Tcl set as a cooling control time, which are shown in FIG. 17, are determined as parameters for the recording strategy. Among other these parameters, the parameter strongly affecting pass or fail of forming the record mark differs depending on the kinds of the mediums, wherein some medium reveals a larger influence by the top width Ttop, some medium reveals a larger influence by the rear edge cooling width Tcl, some medium reveals a larger influence by the rear edge width Tlp, and some medium reveals a larger hybrid influence by the combination of these parameters. In the mark edge recording scheme, it is more often that the top width Ttop and rear edge cooling width Tcl are important parameters because the front and rear edges of the record mark must be suitably recorded.

In the optical disk drive, the recording strategy is generally determined based on a fixed rule, resulting from the constraints such as the circuit scale and the object medium. For example, if the recording is to be performed based on the strategy wherein the top width Ttop has a specified time length, it is determined that the record marks formed have the same value (corresponding to Ttop) for the top widths Ttop. Exemplifying the (1,7) RLL encoding scheme, the record marks 2T to 8T are recorded based on the recording strategy wherein the top pulse width Ttop and the rear edge cooling width Tcl are determined in common to the marks.

The techniques for suitably setting the recording strategy include a β technique which is employed in a DVD rewritable system such as DVD-R. FIG. 18 shows an example of the signal waveform used in the β technique. In the β technique, long mark and space (11T, for example) and short mark and space (3T, for example) are recorded while changing the recording condition, and then reproduced to calculate an asymmetry value (β value), thereby determining a recording condition including the recording strategy.

The β value is obtained by calculating the reference point Ref from the reproducing waveforms of the 11T and 3T record marks, and calculating the following formula $$\beta = 0.5 \times (A-B)/(A+B)$$

where A and B represent the peak level of 11T and the bottom level of 11T, respectively. The β value has a correlation with jitter σ which is an index for evaluating the recording signal quality. By setting the recording condition so that the β value falls within a specified range, a suitable record mark having a small jitter in the reproduced signal can be formed.

In general, if the jitter σ has a value of 15% or above, an error correction processing cannot correct an error in the reproduced signal. Thus, the jitter σ should be suppressed to 15% or below. For example, it is known that the correlation between the jitter σ and the bit error rate BER is such that the bit error rate BER=$10^{-4}$ corresponds to the jitter σ≈12.8%. The factors for degrading the jitter σ include an error in setting the recording power, an error in setting the recording strategy, an error in setting the focus, an error in setting the tilt, and so on.

In a current optical disk drive, even if all the recording conditions are determined at optimum values, the obtained jitter σ is around 8% at the minimum. Since degradation of the jitter allowed for the errors in setting the recording power and the recording strategy is around 2%, it is preferable that the parameters of the recording power and recording strategy be determined during adjustment of the recording condition so that the jitter σ assumes 10% or below.

As a technique for optimizing the recording condition, Patent Publication JP-A-2000-30254 describes a technique wherein as the recording power, the theoretical mark length of the longest mark is determined as an index, whereas as for the recording strategy, a specific recording strategy providing a minimum value for the jitters of all the record marks or the jitter of the shortest record mark is selected.

As a high-density reproducing technique for the optical disk drive, a PRML (partial response maximum likelihood) technique is known wherein correction of the reproduced signal by partial response waveform equalization and detection of the maximum likelihood are combined together (proceedings of 1994 ITE Annual Convention (ITE' 94) of the Television Society, pp 287-288). In this technique, for maximizing the characteristics of the maximum likelihood detector in consideration of the reproduced channel, the reproduced signal is corrected based on the waveforms equalization and then subject to maximum likelihood detection. The use of the PRML technique has the advantage that a high-density reproducing performance can be assured without a sufficiently high resolution capability for the shortest mark.

FIGS. 19A and 19B show an example of the record data and an example of the reproduced signal waveform obtained from the record data, respectively. The solid line 22 in FIG. 19B represents a reproduced signal waveform in the case of higher recording density compared to the case shown by the dotted line 21. As the record mark length recorded on the disk is reduced along with the development of the higher density, the amplitude of the reproduced signal for the short record mark is reduced, as shown in FIG. 19B, whereby it happens that the amplitude may be lower than the signal slice level 23 used for detecting the mark position, although the record mark is actually formed. If the amplitude of the reproduced signal is below the slice level 23, there arises a problem in that the positions of the front edge and the rear edge of the record mark cannot be detected with accuracy.

For a record mark having a length near the optical diffraction limit, in particular, a sufficient amplitude cannot be obtained in the reproduced signal, and a larger influence by the inter-code interference occurs, whereby the detection accuracy of the jitter or asymmetry value is reduced. Thus, in the conventional techniques using the jitter or asymmetry value, including the technique described in the patent publication, the optimization of the recording condition directly by using the reproduced signal is difficult to obtain.

FIG. 20 show examples of the waveform of the reproduced eye-pattern obtained by recording/reproducing on a phase-change disk having an overcoat film thickness (substrate thickness) of 0.1 mm by using an optical disk drive mounting thereon an optical head having a laser waveform of 405 nm and an numerical aperture NA=0.85. FIG. 20A shows a reproduced eye-pattern in the case of recording at a recording density at which the shortest mark in the modulating codes provided a record mark length of 0.166 μm, FIG. 20B shows a reproduced eye-pattern in the case of recording at a recording density at which the shortest mark in the modulating codes provided a record mark length of 0.148 μm, and FIG. 20C shows a reproduced eye-pattern in the case of recording at a recording density at which the shortest mark in the modulating codes provided a record mark length of 0.125 μm. As shown in FIGS. 20A to 20C, as the record mark length of the shortest mark is reduced, i.e., as the recording density becomes higher, separation of the waveforms is difficult to achieve for the short mark at the amplitude center.

FIG. 21 shows the relationship between the shortest mark length and the jitter. It will be understood that the jitter in the reproduced signal increases, as the recording density is increased to reduce the shortest mark length in the modulating codes. In particular, it will be understood that the jitter exceeds 15% in the reproduced signal of the record mark having a shortest mark length, which is shorter than the mark length shown by the dotted line in the figure, wherein the ratio of the reproduced signal amplitude for the shortest mark in the modulating codes to the reproduced signal amplitude for the longest mark in the modulating codes is not larger than 10%. It is known that if the jitter exceeds 15%, the dispersion of each record mark becomes larger to exceed the window allowed for the each mark. This shows that separation of the reproduced signal for the short mark, in particular, is not sufficient to raise an inter-code interference and that the probability of mark generation which is detected in the case of a lower recording density cannot be detected any more using the jitter with high accuracy. It shows similarly that the detection accuracy of the asymmetry of the shortest mark is reduced in the β technique, and that an accurate judgement is not possible as to whether or not the record mark is suitably formed.

If the record mark is recorded with a higher accuracy to the extent where a sufficient amplitude of the reproduced signal is not obtained, then the PRML technique is effective. However, the PRML technique requires an additional PRML circuit to complicate the circuit configuration. In addition, since the bit error rate is calculated in the PRML technique by comparing the known data and the PRML detected recorded/reproduced data, the original data used for this comparison must be given data, and thus are difficult to handle in a general processing scheme unlike the case using the jitter or the asymmetry value.

It is an object of the present invention to solve the above problems and to provide a method for a recording condition setting method which is capable of determining the recording condition with simplicity and higher accuracy even in the case of recording at a high recording density to the extent where the reproduced signal of the shortest mark cannot be directly used, and to provide an information recording device using the same and a program.

DISCLOSURE OF THE INVENTION

The present invention provides, in a first aspect thereof, a method for setting a recording condition on an information recording medium including: recording under a plurality of recording conditions a first test mark which is one unit-record-length longer than a shortest mark among modulating codes used for information recording, and selecting a first recording condition based on a plurality of reproduced signals obtained by reproducing the recorded first test marks; recording under a plurality of recording conditions at least one second test mark which is selected from marks which are two or more unit-record-lengths longer than the shortest mark and not longer than a longest mark, and selecting a second recording condition based on a plurality of reproduced signals obtained by reproducing the recorded second test marks; and determining a recording condition of the shortest mark based on the first and second recording conditions.

In accordance with the first aspect of the present invention, a recording condition under which a suitable signal is reproduced from the test mark is determined for each of the first and second test marks, and then a recording condition under which the shortest mark is suitably formed is determined by using a linear inference interpolation, for example, based on the recording conditions under which the first and second test marks are suitably formed. Accordingly, the recording condition of the shortest mark can be obtained with ease even in the case where the recording condition allowing the shortest mark to be suitably formed cannot be directly determined from the reproduced signal of the shortest mark due to a higher recording density.

The recording condition setting method of the first aspect of the present invention may be applied to recording on an information recording medium wherein an amplitude reproduced from the shortest mark is not larger than 10% of an amplitude reproduced from the longest mark, or on an information recording medium, wherein jitters in the reproduced signals including a reproduced signal from the shortest mark is not smaller than 15%. In such a case, although the recording condition cannot be determined directly from the reproduced signal due to the degraded quality of the signal reproduced from the shortest mark, the recording condition of the shortest mark can be determined based on a recording condition allowing a longer record mark, whose recording condition can be determined directly from the reproduced signal, to be suitably formed.

In the recording condition setting method of the first aspect of the present invention, it is preferable that the plurality of recording conditions be determined by changing at least one of laser power of recording laser, top pulse width, intermediate pulse width, rear edge pulse width and rear edge cooling width. By appropriately setting parameters which have larger influences on the recording on the recording medium among these parameters, the record marks can be suitably formed even for the shortest mark.

In the recording condition setting method of the first aspect of the present invention, it is preferable that the first and second recording conditions be selected based on asymmetries or jitters in the reproduced signals. The first and second recording conditions can be selected based on the reproduced signals of first and second test patterns, similarly to the conventional method.

The present invention provides, in a second aspect thereof, a method for setting a recording condition on an information recording medium including: recording one or more test mark including at least a shortest mark at a plurality of recording densities lower than a recording density of a normal recording operation; reproducing the recorded test marks, to find a recording condition providing a suitable reproducing signal for each of the recording densities; and determining a recording condition for recording at least the shortest mark at the recording density of the normal recording operation, based on the plurality of recording densities and the recording condition providing the suitable reproduced signal.

In accordance with the recording condition setting method of the first aspect of the present invention, one or more test mark including at least the shortest mark among the modulating code is recorded on the information recording medium for each of the plurality of recording densities lower than the recording density of the normal recording operation while changing the recording condition. Then, the recording condition allowing the record mark having the mark length in the test mark to be suitably formed is determined based on reproduced signals therefrom. A recording condition for recording at least the shortest mark during the normal recording operation is determined by inference based on the relationship between the recording conditions for the plurality of recording densities. Accordingly, the recording condition of the shortest mark can be obtained with ease using the recording condition determined for the lower recording densities, even in the case where the recording condition cannot be directly determined using the reproduced signal of the shortest mark during the normal recording operation.

In the recording condition setting method of the second aspect of the present invention, it is preferable that the plurality of recording densities be obtained by using at least one of a channel clock which has a period longer than a channel clock used in the normal recording operation, and a linear velocity which is higher than a linear velocity of the recording medium used in the normal recording operation. In this case, the plurality of recording densities lower than that in the normal recording operation can be obtained with ease.

In the recording condition setting method of the second aspect of the present invention, it is preferable that an amplitude reproduced from the shortest mark be not larger than 10% of an amplitude reproduced from a longest mark for the recording density of the normal recording operation, and that an amplitude reproduced from the shortest mark be not smaller than 10% of an amplitude reproduced from the longest mark for each of the plurality of recording densities lower than the recording density of the normal recording operation. In this case, the reproduced signals of the shortest mark for the lower recording densities are directly used to determine the recording condition allowing the shortest mark to be suitably formed at the lower recording densities, and the recording density allowing the shortest mark to be suitably formed can be set for the normal recording operation by using them.

In the recording condition setting method of the second aspect of the present invention, it is preferable that the recording condition of the shortest mark be obtained by approximation using a quadratic function. By approximating the relationship between the recording conditions allowing the shortest mark to be suitably formed at the plurality of recording densities with a quadratic curve, a recording condition which allows the shortest mark to be suitable formed during the normal recording operation can be determined with ease.

In the recording condition setting method of the present invention, it is preferable that the shortest mark satisfy the following relationship:

$$\text{shortest mark length} \geq (\alpha/d) \times \lambda/(4 \times NA),$$

(where $1.0 < \alpha/d < 1.2$), which is defined by a numerical aperture NA of a focusing lens for forming an optical spot on the information recording medium, a light source wavelength $\lambda$, a substrate thickness d of the information recording medium, and a constant $\alpha$. If the shortest mark length is set near the optical diffraction limit, then in general, the recording condition of the shortest mark cannot be determined directly by using the reproduced signal due to the small amplitude of the reproduced signal of the shortest mark. However, in the present invention, the recording condition allowing the shortest mark to be suitably formed can be determined with ease even in such a case.

The recording condition setting method of the present invention may be such that the numerical aperture NA is 0.6 to 0.7, the light source wavelength λ is 390 to 410 nm, the substrate thickness of the optical disk for recording thereon is 0.6 mm, and the lower limit of the shortest mark length is 145 nm.

In the recording condition setting method of the present invention, the configuration may be such that the numerical aperture NA is 0.7 to 0.85, the light source wavelength λ is 390 to 410 nm, the substrate thickness of the optical disk for recording thereon is 0.1 mm, and the lower limit of the shortest mark length is 120 nm.

The present invention provides, in third aspect thereof, an information recording device for optically recording information on an information recording medium, including: a recording condidtion setting means for setting a recording condidtion upon recording information on the information recording medium; a recording means for recording a first test mark and at least one second test mark by using a plurality of recording conditions set by the recording condition setting means, the first test mark being one unit-record-length longer than a shortest mark among modulatoing codes used for information recording, the second test mark being two or more unit-record-lengths longer than the shortest mark and not longer than a longest mark; a reproducing means for reproducing the first test mark and the second test mark from the information recording medium to generate reproduced signals of the first test mark [[;and all]], the recording condition setting means [[for]] setting a recording condition of the shortest mark based on the first recording condition and the second recording condition selected by the signal processing means.

In accordance with the information recording device of the third aspect of the present invention, the signal processing means selects the recording condition allowing the signal reproduced from the test mark for each of the first and second test marks recorded at the plurality of recording densities to be suitably formed. The recording condition setting means sets a recording condition allowing the shortest mark to be suitably formed by using a linear inference interpolation, for example, based on the recording conditions allowing the selected first and second test marks to be suitably formed. Accordingly, the information recording device can set the recording condition of the shortest mark with ease even in the case where the recording condition allowing the shortest mark to be suitably formed cannot be directly determined from the reproduced signal of the shortest mark due to a high recording density.

The present invention provides, in a fourth aspect thereof, an information recording device for optically recording information on an information recording medium, including: a recording means for recording one or more test mark including at least a shortest mark at a plurality of recording densities lower than a recording density of a normal recording operation; a reproducing means for reproducing the test mark recorded by the recording means to generate reproduced signals; a signal processing means for determining a recording condition providing a suitable reproduced signal among the reproduced signals for each of the plurality of recording densities; and a recording condition setting means for setting a recording condition for recording at least the shortest mark at the recording density of the normal recording operation, based on the plurality of recording densities and the recording density providing the suitable reproduced signal.

In accordance with the information recording device of the fourth aspect of the present invention, the signal processing means determines the recording condition allowing the record mark having a corresponding mark length in the test mark to be suitably formed based on the reproduced signal therefrom, for each of the plurality of recording densities lower the recording density of the normal recording operation, by recording one or more test mark including at least the shortest mark among the modulating codes while changing the recording condition. The recording condition setting means determines by inference the recording condition of at least the shortest mark during the normal operation mode based on the relationship between the recording conditions for the plurality of recording densities. Consequently, the information recording device determines the recording condition of the shortest mark with ease by using the recording conditions obtained by lower recording densities even in the case where the recording condition cannot be determined directly by using the reproduced signal of the shortest mark during the normal recording operation.

The present invention provides, in a fifth aspect thereof, a program for setting a recording condition for recording information on an information recording/reproducing medium, the program defining: the step of setting a plurality of test recording conditions based on an initial recording condition set in advance for the information recording medium or an information recording/reproducing device; the step of recording signals under each of the set test recording conditions by using data including a test mark (first test mark) which is one unit-record-length longer than a shortest mark among modulating codes used for information recording and a test mark (second test mark) which is two or more unit-record-lengths longer than the shortest mark and not longer than a longest mark; the step of reproducing the recorded signals to detect asymmetries or jitters in the reproduced recorded signals; the step of extracting a recording condition for each of the first test mark and the second test mark based on the asymmetryies or absolute values of the jitters detected for each of the test recording conditions; and the step of determining a recording condition of the shortest mark based on the recording conditions obtained for the first test mark and the recording condition obtained for the second test mark.

In accordance with the program of the fifth aspect of the present invention, the recording condition of the shortest mark can be determined with ease by the computer controlling the read/write device for the information recording medium, even in the case where the recording condition cannot be determined directly by using the reproduced signal of the shortest mark during the normal recording operation due to a high recording density.

The present invention provides, in a modification of the fifth aspect thereof, a program for setting a recording condition for recording information on an information recording/reproducing medium, the program consecutively defining: the first step of selecting a plurality of test recording conditions based on an initial recording condition set in advance for the information recording medium or an information recording/reproducing device; the second step of recording signals under each of the selected test recording conditions by using data including a record mark (first test mark) which is one unit-record-length longer than a shortest mark among modulating codes used for information recording and at least one record mark (second test mark) which is two or more unit-record-lengths longer than the shortest mark and not longer than a longest mark; the third step of reproducing the recorded signals to detect asymmetries or jitters of reproduced signals thus reproduced; the fourth step of judging pass or fail of each of the test recording conditions based on an asymmetry or an absolute value of jitter detected for each of the test recording conditions, to return to the second step to re-select the test recording condition if there is no test recording condition judged to pass for one of the first test mark and the second test mark, or to advance to a next step if there is a test recording condition judged to pass for any of the first test mark and the second test mark; and the fifth step of determining a recording condition of the shortest mark based on the test recording condition obtained for the first test mark and judged to pass, and the test recording condition obtained for the second test mark and judged to pass.

In accordance with the program of the modification of the fifth aspect of the present invention, the process advances to the fifth step at the stage in the fourth step when there are test recording conditions judged to pass for both the first test mark and the second test mark. Consequently, if values for the two parameters of the recording condition are changed within specified ranges to determine a recording condition, the second step need not be conducted for all of the combinations, and accordingly, the time length for determining the recording condition can be reduced compared to the case where the second step is conducted for all of the possible combinations.

The present invention provides, in a sixth aspect thereof, a program for setting a recording condition for recording information on an information recording/reproducing medium, the program defining: the step of setting a plurality of recording densities lower than a recording density of a normal recording operation; selecting a plurality of test recording conditions for each of the plurality of recording densities based on an initial recording condition set in advance for the information recording medium or an information recording/reproducing device; the step of recording under each of the selected test recording conditions a signal including a mark having a specified number of unit-record-lengths; the step of reproducing the recorded signal for each of the plurality of recording densities to detect an asymmetry or jitter of the reproduced signal thus reproduced; the step of selecting a test recording condition for the mark having the specified number of unit-record-lengths for each of the recording densities based on the asymmetry or an absolute value of the jitter detected for each of the recording conditions; and the step of setting a recording condition for recording the mark having the specified number of unit-record-lengths at the recording density of the normal recording operation based on the plurality of recording densities and the test recording condition selected for each of the recording densities.

In accordance with the program of the sixth aspect of the present invention, by recording the shortest mark, for example, as a mark having a specified mark length based on the control by the computer controlling a device for reading/writing on the information recording/reproducing medium, the recording condition of the shortest mark can be determined with ease by using the recording condition of the shortest mark determined for the lower recording densities, even in the case where the recording condition cannot be determined directly by using the reproducing signal of the shortest mark of the shortest mark during the normal recording operation.

The present invention provides a modification of the sixth aspect thereof, a program for setting a recording condition for recording information on an information recording/reproducing medium, the program consecutively defining: the first step of setting one of a specified number of recording densities lower than a recording density of a normal recording operation; the second step of selecting a plurality of test recording conditions based on an initial recording condition, which is set in advance for the information recording medium or an information recording/reproducing device, or based on a corrected recording condition; the third step of recording under each of the selected test recording conditions a signal including a mark having a specified number of unit-record-lengths; the fourth step of reproducing the recorded signals to detect asymmetries or jitters of reproduced signals thus reproduced; the fifth step of judging pass or fail of each of the test recording conditions based on asymmetry or jitter detected for each of the test recording conditions, to return to the second step to re-select the test recording condition if there is no test recording condition judged to pass, to return to the first step to select another of the recording densities if there is a test recording condition judged to pass for any of the first test mark and the second test mark and if selection of all of the specified number of recording densities is not completed, or to advance to a next step if there is a test recording condition judged to pass for any of the first test mark and the second test mark and if selection of all of the specified number of recording densities is completed; and the sixth step of determining a recording condition for recording the mark having the specified number of unit-record-lengths under the recording condition of the normal recording operation based on the specified number of recording densities and the recording condition selected for each of the recording densities.

In accordance with the program of the modification of the sixth aspect of the present invention, since it is judged in the fifth step whether there is a recording condition which is judged to pass for both the first test mark and the second test mark, the third step is not executed for all the combinations if the values for the two parameters of the recording condition are changed within the specified range to set the recording condition. Consequently, the time length for determining the recording condition can be reduced compared to the case where the second step is executed for all of the possible combinations.

In the recording condition setting method of the first aspect, the information recording device using the same and the program, the recording condition allowing the first and second test marks to be suitably formed is selected based on the reproduced signal of each of the first and second test marks, and the recording condition of the shortest mark is determined based on the selected recording conditions of the first and second test marks. Consequently, since the ratio between the amplitude of the reproduced signal of the longest mark and the amplitude of the reproduced signal of the shortest mark is not larger than about 10%, the recording condition of the shortest mark can be determined with ease even in the case where the recording condition cannot be determined directly by using the reproduced signal of the shortest mark.

Furthermore, in the recording condition setting method of the second aspect, the information recording device using the same and the program, the recording condition allowing the test mark including at least the shortest mark among the modulating codes to be suitably formed is determined based on the reproduced signal thereof, and at least the recording condition of the shortest mark is determined by inference based on the relationship between the recording conditions for the plurality of recording densities. Consequently, the recording condition of the shortest mark can be determined without adding a new detecting function even in the case where the recording condition cannot be determined directly by using the reproduced signal of the shortest mark during the normal recording operation.

BRIEF DESCRIPTION OF THE DRAWINGS

FIGS. 12A and 12B are tables showing examples of the recording condition tables prepared in the step S42.

FIGS. 15A, 15B and 15C are tables showing examples of the recording condition tables prepared in the step S63.

BEST MODES FOR CARRYING OUT THE INVENTION

Figures 1, 2:
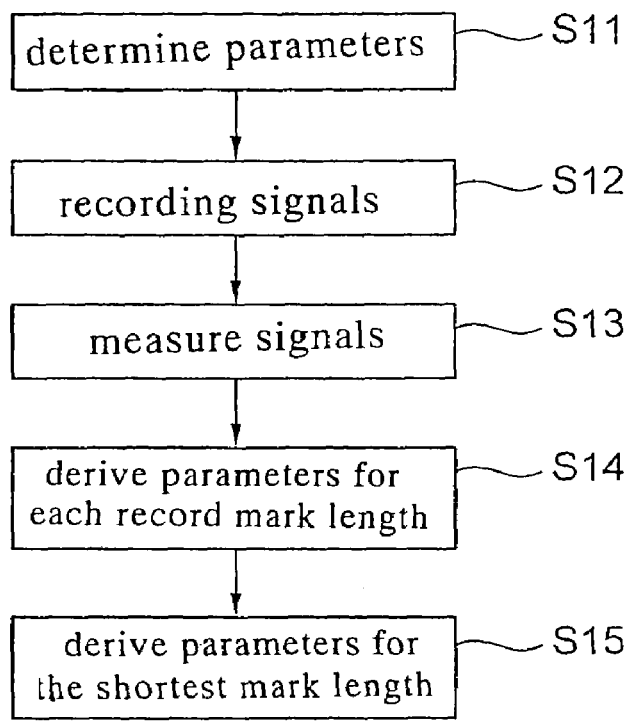
FIG. 1 is a flowchart showing the flow of the procedure in a recording condition setting method according to a first embodiment of the present invention.
FIG. 2 is a table showing an example of the combination of recording conditions changed in the step S2 shown in FIG. 1.

Hereinafter, the present invention will be described in more detail with reference to the drawings based on the embodiments of the present invention. Referring to FIG. 1, the procedure of a recording condition adjusting method according to a first embodiment of the present invention is schematically shown therein. An optical disk drive for recording/reproducing the information determines the recording condition including each parameter of the recording strategy according to the procedure shown in the drawing, prior to recording information on the optical disk (information recording medium).

First, the default of each parameter of the recording strategy including a recording power used for recording is read out from the optical disk drive or the optical disk itself of the object for recording (step S11). For example, these defaults are determined in advance by the manufacturer as the recording condition suited for the optical disk of the object for recording, and recorded in the memory of the optical disk drive or in the specified area of the optical disk. In step S11, for example, the parameters such as the top width Ttop and rear edge cooling width Tcl in the (n−1)-pulse train similar to the waveform shown in FIG. 17B as well as the recording power suited for the optical disk of the object for recording are read out.

Subsequently, a specified record pattern is recorded on the optical disk while changing the recording condition. The specified record pattern used for the recording includes a record mark (first test mark) which is 1T longer than the shortest mark and another record mark (second test mark) which is at least 2T longer than the shortest mark and not longer than the longest mark (Lmax), wherein the shortest mark is such that the ratio between the amplitude of the reproduced signal of the longest mark to the amplitude of the reproduced signal of the shortest mark (Lmin) among the run-length-limited, modulated-recorded data is not larger than 10%. In step S12, for example, the specified record pattern is recorded on the optical disk while changing, sector by sector, the recording condition including a default recording power and the width of a default top width Ttop of the (n−1)-pulse train read out in step S11, within the range of ±0.15T in changing the latter, thereby recording the specified record pattern on the optical disk at 2048 bytes/sector.

Subsequently, the record pattern recorded in step S12 is reproduced, to calculate an asymmetry value for each of the record mark length from the reproduced signal of the specified record pattern excluding therefrom the shortest mark length (step S13). After the asymmetry value is calculated, the recording power and each parameter of the recording strategy for the record mark lengths except for the shortest mark length, which allow the record marks to be suitably recorded, are determined based on the correlation between the jitter value and the asymmetry value (step S14). Then, each parameter of the recording strategy for the shortest mark is determined by calculation based on each parameter of the recording strategies for the respective record mark lengths determined in step S14. More specifically, if the modulated record data follow the (1,7) RLL encoding scheme, the top pulse width 2Ttop of the shortest mark length 2T is calculated using the inference interpolation based on the top pulse width 4Ttop of the 4T mark length and the top pulse width 3Ttop of the 3T mark length which are determined in step S14. The inference interpolation may use the following formula:

$$2Ttop = 2 \times 3Ttop - 4Ttop.$$

In the present embodiment, each of the parameters of the recording strategy for the shortest mark is determined by using each parameter of the recording strategy for the record mark which is 1T longer than the shortest mark and each parameter of the recording strategy for another record mark which is 2T or more longer than the shortest mark and not longer than the longest mark, which are included in the specified record pattern. Consequently, even if the jitter in the reproduced signal is large and thus each of the recording strategy cannot be determined from the reproduced signal of the shortest mark, each parameter of the recording strategy allowing the record mark having the shortest mark length to be suitably recorded can be determined with ease.

EXAMPLE 1

As an example, an experiment was performed while using an optical disk drive, which mounts thereon an optical head having a numerical aperture NA of 0.85 and a laser wavelength λ of 405 nm. In the experiment, the recording condition for recording on a phase-change optical disk having an overcoat layer of 0.1 mm thickness and running at a linear speed of 5 m/s, with the shortest mark for the (1,7) RLL encoding scheme being set at 0.13 μm (the shortest bit length corresponding to 0.104 μm/bit) was determined based on the procedure shown in FIG. 1. The (n−1)-pulse train shown in FIG. 17B was used as the driving waveform of the laser for forming the record mark on the optical disk. In the optical disk drive, each of the parameters other than the recording power Pw, top width Ttop and rear edge cooling width Tcl was set at the default read from the optical disk itself in step S1 (FIG. 1).

FIG. 2 exemplifies combinations of changes in the recording condition. In step S12 (FIG. 1), the recording power Pw is changed with a 5% step difference, with the value read in step S11 being the center, within the range between −10% and +10% thereof. The top width Ttop and the rear edge cooling width Tcl are respectively changed with a 0.05T step difference, with the defaults read in step S11 being the centers, within the range between −0.15% and +0.15% thereof. For example, if the top pulse width Ttop read in step S11 is 1T, then the top pulse width Ttop is changed within the range between 0.85T and 1.15T, whereas if the top pulse width Ttop read is 0.5T, then the top pulse width Ttop is changed within the range between 0.35T and 0.65T.

In the experiment the recording power Pw was changed within the range specified by the half-tone dot meshing (at 25 different values) for each of the top width Ttop and the rear edge cooling width Tcl thus changed. The top width Ttop and the rear edge cooling width Tcl were changed in an ascending order, at discretion, to determine combinations wherein the rear edge cooling width Tcl was changed with the top width Ttop being fixed, or combinations wherein the top width Ttop was changed with the rear edge cooling width Tcl being fixed.

In step S12, each of the marks from the shortest mark (2T) to the longest mark (8T) is recorded in the PCA (power calibration area) of the optical disk at 2048 bytes/sector while changing the combinations shown in FIG. 2. In step S12, the recording power Pw for each of the top width Ttop and the rear edge cooling width Tcl was first selected. Upon the selection of the recording power, 8T mark and space having a large signal amplitude and thus suited for the object of adjustment were used. More specifically, a technique was employed which was conventionally used to select the laser power as the recording power, which allows the 8T mark and space to have a size nearest to the theoretical value.

Subsequently, in step S13, the record marks thus recorded were reproduced to calculate the asymmetry value for each of the recording conditions with respect to each of the record marks except for the shortest mark (2T), thereby determining, based on the asymmetry value, the parameters (Ttop, Tcl) of the recording strategy allowing a suitable recording, for each of the record marks. Since the asymmetry value changes depending on the combination of the optical head and the type of the optical disk, the range within which the recording is suitably performed depending on the configuration of the optical head should be preferably estimated in advance. Alternatively, if there is a recommended value depending on the optical disk, it may be judged based on the recommended value. It should be noted that, as for each of the top width Ttop and the rear edge cooling width Tcl for recording the 4T mark to the 8T mark, a common value can be employed for these record marks. Thus, in the present embodiment, parameters of the recording strategy for suitably recording the 4T mark were determined, and the same parameters for the 4T mark were used for the 5T mark to 8T mark.

In step S15, the parameters (2Ttop, 2Tcl) of the recording strategy for the shortest mark 2T were determined by inference interpolation from the relationship between the parameters (3Ttop, 3Tcl) of the recording strategy for the 3T mark which is 1T longer than the shortest mark 2T and the parameters (4Ttop, 4Tcl) of the recording strategy for the 4T mark which is 2T longer than the shortest mark 2T. In the inference interpolation, a linear interpolation was used based on:

$$2Ttop = 2 \times (3Ttop) - (4Ttop); \text{ and}$$

$$2Tcl = 2 \times (3Tcl) - (4Tcl),$$

wherein a difference in the parameter between the 3T mark and the 4T mark is subtracted from the parameter for the 3T mark.

It should be noted that, as for the signal reproduced from the signal recorded in step S12, since the amplitude ratio between the signals reproduced from the shortest mark 2T and the longest mark 8T of the run-length-limited, modulated-recorded data was not larger than 10%, the jitter for each mark had a large dispersion. Consequently, the jitter between the clock and the data exceeded 15%, whereby measurement of the performance was not possible based on the jitter of the reproduced signal.

Figure 3:
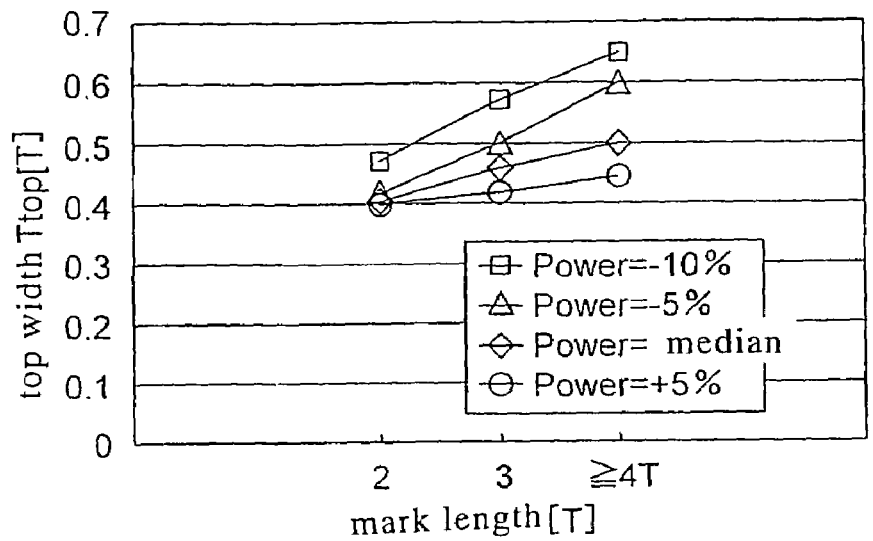
FIG. 3 is a graph showing the relationship between the top width Ttop and the record mark length.
Figure 4:
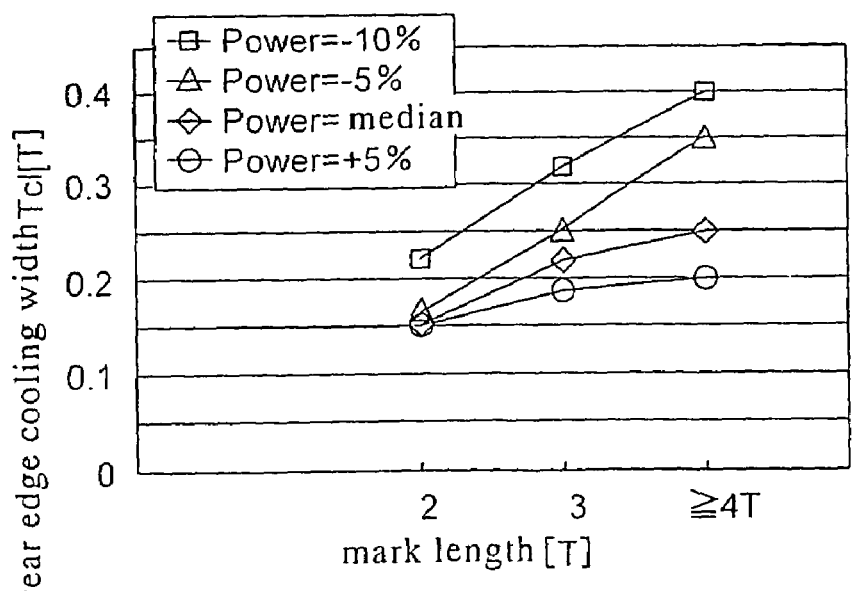
FIG. 4 is a graph showing the relationship between the rear edge cooling width Tcl and the record mark length.

FIGS. 3 and 4 show the relationship between the parameters of the recording strategy determined in the above example and the mark length. In FIG. 3, the ordinate indicates the top width Ttop, whereas the abscissa indicates the record mark length. In addition, the top width Ttop of the 2T mark length is determined from the relationship between both the top widths Ttop of the 3T mark length and the 4T mark length (more than 4T mark length). In FIG. 4, the ordinate indicates the rear edge cooling width Tcl, whereas the abscissa indicates the record mark length. In addition, the rear edge cooling width Tcl of the 2T mark length is determined from the relationship between both the rear edge cooling widths of the 3T mark length and the 4T mark length (more than 4T mark length). Moreover, in FIGS. 3 and 4, each parameter of the recording powers from −10% to +15% is plotted, with the record powers determined in step S14 (FIG. 1) being medians (◇). As shown in FIGS. 3 and 4, along with the rise of the record power, the top width Ttop for each record mark length is shortened (reduced).

Subsequently, verification is performed based on PRML detection in order to judge whether or not the recording condition determined based on the procedure shown in FIG. 1 is suitable. By recording under the recording condition as determined above, it was confirmed that the bit error rate (referred to as BER hereinafter) did not exceed $10^{-4}$. In addition, as a reference, each parameter (Ttop, Tcl) for the recording power from −10% to +15%, with the recording power determined in step S14 being a median, was determined to verify the bit error rate, resulting in a BER of not larger than $10^{-4}$ in the recording by using these recording conditions. More specifically, the −10% to +15% of the recording power is a margin with respect to the median recording power.

As described in connection with the above example, by determining the parameters of the recording strategy for the 2T mark based on the strategy for the 3T mark and the 4T or longer mark, parameters of the recording strategy for forming the 2T mark can be determined with ease and higher accuracy even in the case where the 2T mark is to be formed at a recording density wherein the jitter and asymmetry cannot be determined by using the reproduced signal.

Figure 5:
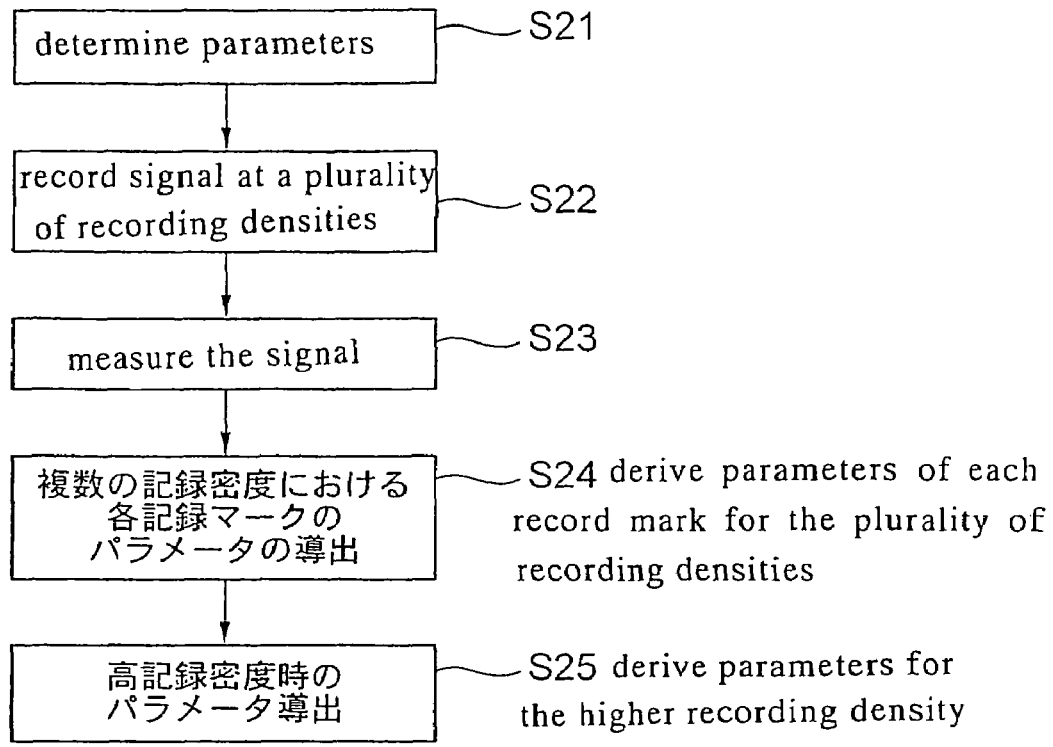
FIG. 5 is a flowchart showing the flow of procedure in a recording condition setting method according to a second embodiment of the present invention.

FIG. 5 shows a schematic procedure for a recording condition setting method according to a second embodiment of the present invention. In the present embodiment, by changing the linear velocity and the channel clock period to lower the recording density so as to allow the jitter and asymmetry to be calculated using the reproduced signal even for the shortest mark, each parameter of the recording strategy at the recording density is determined, and based on the determined parameter, each parameter of the recording strategy at a higher recording density is determined.

As shown in FIG. 5, each parameter of the recording power and the recording strategy is first read, similarly to step S11 shown in FIG. 1, and set as a default (step S21). If each parameter of the recording power and the recording strategy is recorded (stored) for each of a plurality of recording conditions (recording densities), the each parameter of the recording power and the recording strategy is read therefrom for each of the recording conditions.

Subsequently, a specified record pattern including respective mark lengths in the modulating scheme is recorded on the optical disk while changing each parameter of the recording power and the recording strategy and alleviating the recording condition to change the recording density (step S22). In this step, the recording density under which the ratio between the amplitude of the signal reproduced from the longest mark length and the amplitude of the signal reproduced from the shortest mark length is not larger than 10% under the normal circumstances is changed to a recording density allowing the amplitude ratio to assume more than 10% by alleviating the recording condition. In step S2, each parameter of the recording power and the recording density is changed during the recording, for each of the recording densities wherein the shortest mark assume a length of Lp2, Lp1 and Lp0 (Lp2>Lp1>Lp0>Lmin), given Lmin being the shortest mark length at the normal recording density.

The data recorded in step S22 are then reproduced, calculating the jitter values or β values based on the reproduced signals (step S23). Although the amplitude ratio in the reproduced signal between the longest mark and the shortest mark is not larger than 10% and thus the jitter value and β value of the shortest mark are not determined directly by using the reproduced signal at the normal recording density, the lower recording densities in the recording allows the jitter value and β value to be calculated directly by using the reproduced signal. Based on the jitter value or β value calculated in step S23, each parameter of the recording power and the recording strategy by which the record signal for each record mark length is suitably reproduced is determined for each of the recording densities (step S24).

Each parameter of the recording strategy for recording at the normal recording density is determined based on each parameter of the recording strategy determined for the recording densities lower than the normal recording density (step S25). If the recording is performed at three recording densities providing shortest mark lengths of Lp2, Lp1 and Lp0 (Lp2>Lp1.Lp0>1 min), each parameter for the respective mark length providing a shortest mark length of Lmin during the normal recording operation is determined by inference interpolation based on the parameters of the three recording strategies for the respective mark lengths. For example, the inference interpolation may use a quadratic approximation or so, for the shortest record mark length or a record mark length which is 1 channel clock period longer than the shortest record mark length, and may use a first order approximation for a longer record mark length.

In the present embodiment, the jitter value or β value of the reproduced signal is calculated for a lower recording density, and based on the recording strategy determined from the calculated value, parameters of the recording strategy for the higher normal recording density is determined by inference interpolation. The setting of the parameters for the state of the lower recording densities can be performed similarly to the conventional technique and thus need not an additional device. Consequently, parameters of the recording strategy, based on which a suitable recording can be performed, can be determined with ease even in the case of a higher recording density wherein the jitter value and β value cannot be calculated directly by using the reproduced signal.

EXAMPLE 2

As an example, an experiment was performed using an optical disk drive mounting thereon an optical head having a numerical aperture NA of 0.65 and a laser wavelength λ of 405 nm. In the experiment, the recording condition for recording on a phase-change optical disk having an overcoat layer of 0.6 mm thickness, with the 2T shortest mark length (Lmin) for the (1,7) RLL encoding scheme being set at 0.125 μm, was determined based on the procedure shown in FIG. 5. The ratio between the amplitude of the signal reproduced from the longest mark and the amplitude of the signal reproduced from the shortest mark upon setting the 2T shortest mark length at 0.125 μm was not more than 10% and the jitter of the reproduced signal including the signal reproduced from the shortest mark exceeded 15%, whereby it was impossible to determine the parameters etc. of the recording strategy directly by using the reproduced signal.

Figure 17:
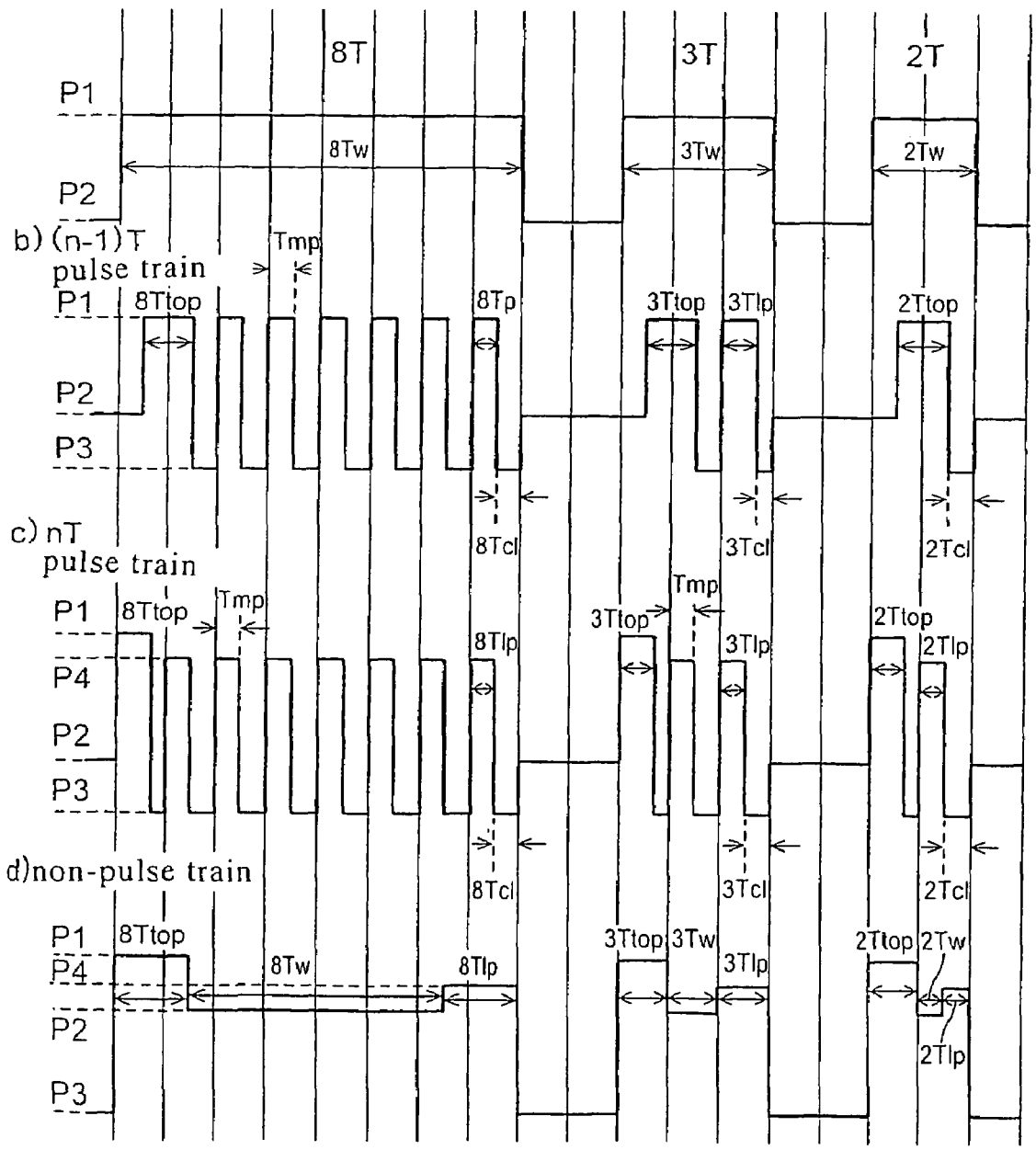
FIG. 17 is a waveform diagram showing an example of the general laser driving waveform used in forming the record mark.
Figure 18:
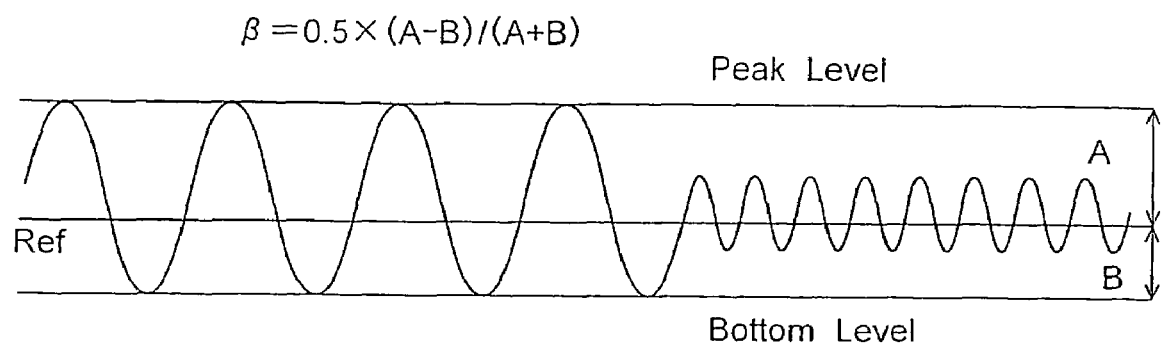
FIG. 18 is an example of the waveform of the signal used for a general asymmetry value (β value).
Figure 19A:
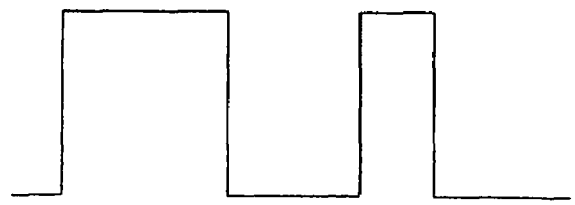
FIGS. 19A and 19B are waveform diagrams showing waveforms of the record data and the reproduced signal.
Figure 19B:
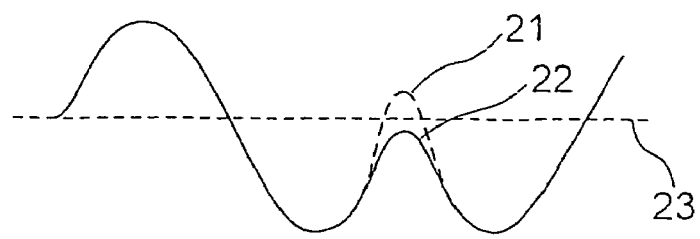
Figure 20A:
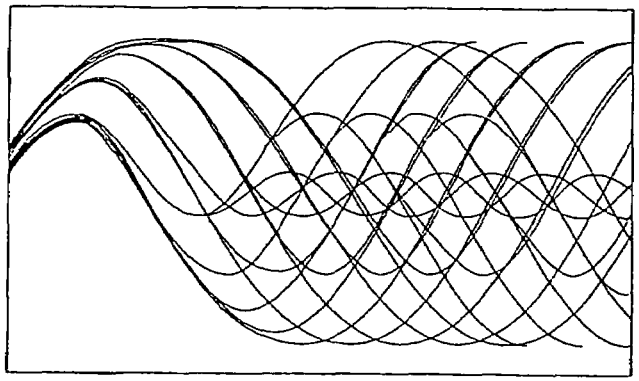
FIG. 20 is a exemplified waveform of the reproduced eye-pattern in the case of changing the shortest mark length.
Figure 20B:
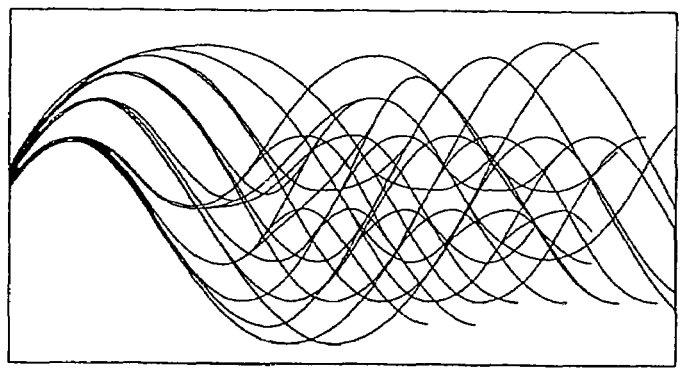
Figure 20C:
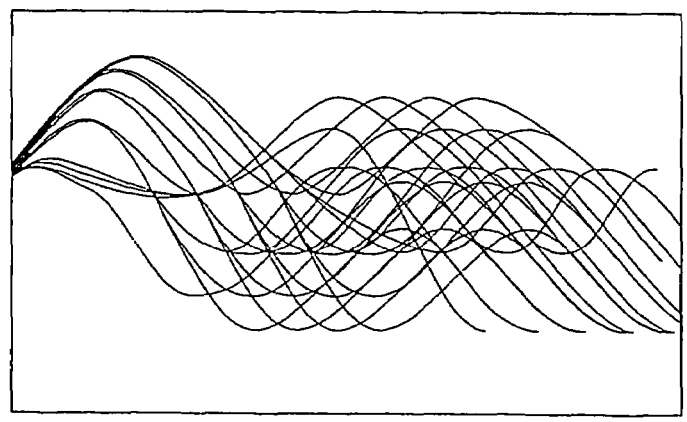
Figure 21:
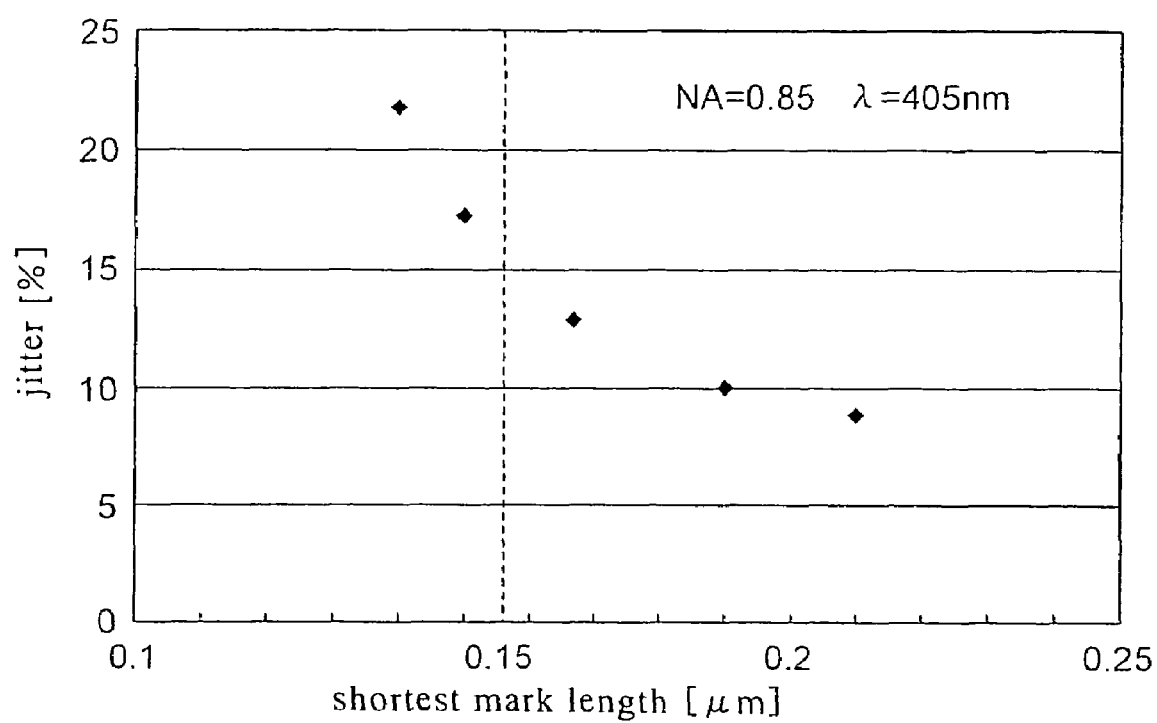
FIG. 21 is a graph showing the relationship between the shortest mark length and the jitter of the reproduced signal thereof.

In the experiment, the (n−1)-pulse train shown in FIG. 17B was used as the driving waveform for forming the record mark on the optical disk. In the optical disk drive, the parameters other than the recording power Pw, top width Ttop and rear edge cooling width Tcl were set at the defaults read from the optical disk drive or the optical disk itself in step S21 (FIG. 5).

In step S22, a specified record pattern including each of the marks from the shortest mark (2T) to the longest mark (8T) is recorded in the PCA (power calibration area) of the optical disk at 2048 bytes/sector while changing the combination similarly to the combinations shown in FIG. 2. In this step, the recording density was changed by lowering the channel clock speed while fixing the linear velocity. More specifically, the recording density is lowered from the recording density where the shortest mark length Lmin=0.125 to the recording densities where the Lp2=0.17 μm, Lp1=0.16 μm and Lp0=0.15 μm. In this case, at the recording densities where the shortest mark length was not shorter than Lp0, the ratio between the amplitude of the signal reproduced from the longest mark length and the amplitude of the signal reproduced from the shortest mark length exceeded 10%, and the jitter of the reproduced signal was smaller than 15%.

In step S24, first, the recording power is selected similarly to the procedure of step S14 in the example 1. Subsequently, the record mark thus recorded was reproduced to calculate the asymmetry value for each of the recording conditions, and based on the asymmetry, parameters (Ttop and Tcl) of the recording strategy allowing the recording to be suitably performed were determined for each of the recording densities and for respective record mark lengths.

Figure 6:
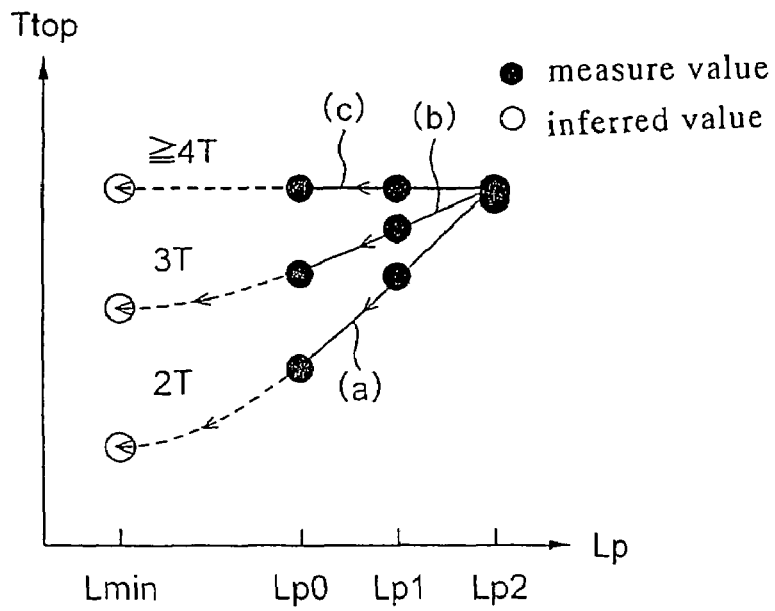
FIG. 6 is a graph showing the relationship between the top width Ttop and the shortest mark length (recording density).

FIG. 6 shows the relationship between the parameters of the recording strategy determined in the above example and the recording densities (shortest mark length Lmin). In step 25, the parameter (○ of graph (a)) of the recording strategy at the normal recording density (shortest mark length Lmin) was determined by a quadratic approximation from the relationship between the parameters (● of graph (a)) of the recording strategy for the shortest marks 2T in the respective recording densities. Similarly, the parameter (○ of graph (b)) of the recording strategy at the normal recording density (shortest mark length Lmin) was determined by a quadratic approximation from the relationship between the parameters (● of graph (b)) of the recording strategy for the 3T marks in the respective recording densities, whereas parameters (○ of graph (b)) at the normal recording density (shortest mark length Lmin) were determined by a first order approximation from the relationship between the parameters (● of graph (c)) of the recording strategy for the 4T marks in the respective recording densities.

Subsequently, verification was performed by PRML detection for verifying whether or not the recording conditions determined based on the procedure shown in FIG. 5 were suitable. After the recording was performed under the recording conditions determined as above, it was confirmed that the bit error rate (referred to as BER hereinafter) in the PRML did not exceed the target value of $10^{-4}$.

As described above in connection with the examples, it is confirmed that each parameter of the recording strategy can be determined with ease even in the case where jitter or asymmetry cannot be determined directly by using the reproduced signal, by determining each parameter of the recording strategy at lower recording densities for a plurality of recording densities, then determining the parameters at a higher recording density by the inference interpolation based on the relationship between the parameters for the plurality of recording densities.

Figure 7:
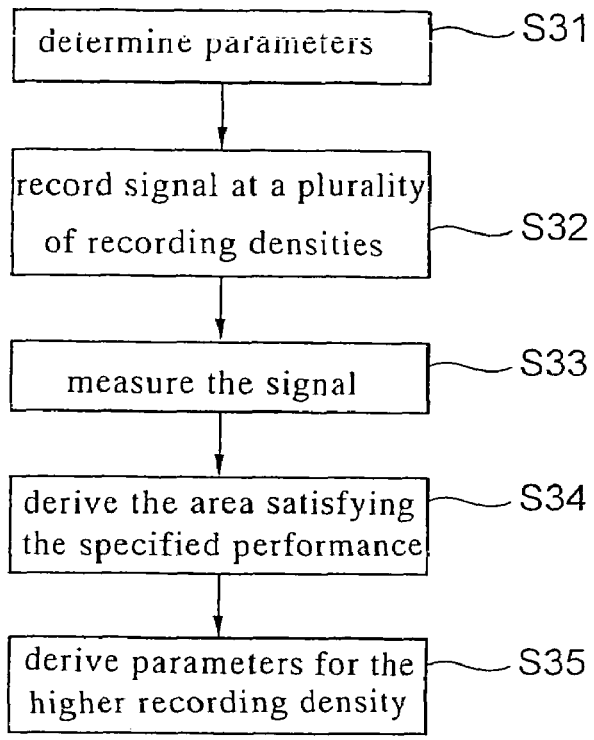
FIG. 7 is a flowchart showing the flow of a procedure in a recording condition setting method according to a third embodiment of the present invention.

FIG. 7 shows a schematic procedure of a recording condition setting method according to a third embodiment of the present invention. Similarly to step S21 shown in FIG. 5, each parameter of the recording power and the recording strategy is read and set as a default (step S31). Subsequently, a specified record pattern including the record mark lengths in the modulating scheme is recorded on the optical disk while changing each parameter of the recording power and the recording strategy and alleviating the recording condition to thereby change the recording density (step S32). In this step, the ratio between the amplitude of the signal reproduced from the longest mark and the amplitude of the signal reproduced from the shortest mark is set not smaller than 10% for any of the plurality of recording densities. In step S32, the specified record pattern is recorded at 2040 bytes/sector for each of the recording densities wherein the shortest mark length assumes Lp2, Lp1 and Lp0 (Lp2>Lp1>Lp0>Lmin). The data recorded in step S32 are reproduced to measure the performance of the reproduced signal based on the reproduced data (step S33). In the measurement of the performance, for example, bit error rate using the PRML detection can be used. Based on the measured performance, the range of the recording condition satisfying the specified performance indexes for each record mark length is determined (step S34).

Figure 8:
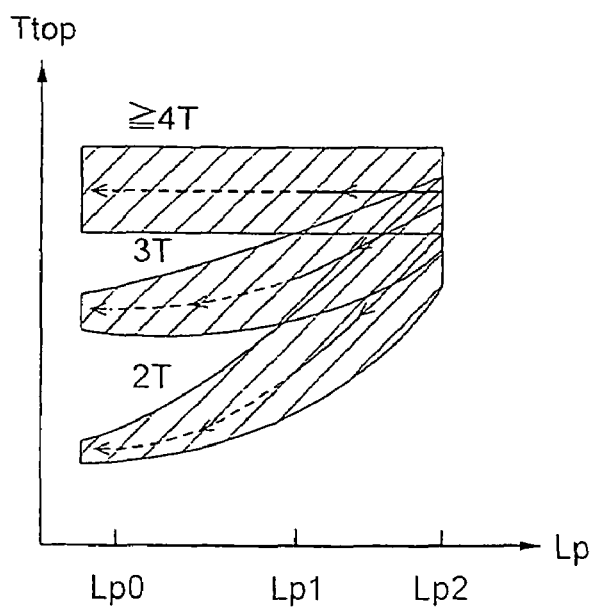
FIG. 8 is a graph showing the relationship between the top width Ttop and the shortest mark length (recording density).

FIG. 8 shows the range for each of the record mark lengths, wherein the bit error rate assumes not larger than $10^{-4}$ for different top widths Ttop changed. In step S34, the range shown by hatching, where the bit error rate BER assumes $10^{-4}$ or lower, is determined by the boundary which divides pass or fail of the specified performance for each record mark at each recording density.

By using the range determined in step S34, the recording condition is determined for the recording density wherein the ratio between the amplitude of the signal reproduced from the longest mark and the amplitude of the signal reproduced from the shortest mark is not larger than 10%, i.e., wherein the performance is not determined directly by using the reproduced signal. For example, to determine the top width 2Ttop of the shortest mark 2T at the higher recording density from the range shown in FIG. 8, the parameters defining the boundary of the range satisfying the specified performance for each of the Lp2, Lp1 and Lp0 is used to determine by approximation the relational expressions, based on which the recording parameters of the 2Ttop may be determined.

In the present embodiment, due to the approximation by using a plurality of relational expressions based on the boundary of the range satisfying the specified performance, the parameters defined by the plurality of relational expressions are selected, upon setting the recording condition, from the range satisfying the specified performance even in the case where the jitter of the reproduced signal exceeds 15% due to a higher recording density. It should be noted that the parameters defined by the plurality of relational expressions may be defined by a plurality of values falling within the range instead of the boundary of the range satisfying the specified performance.

Figure 9:
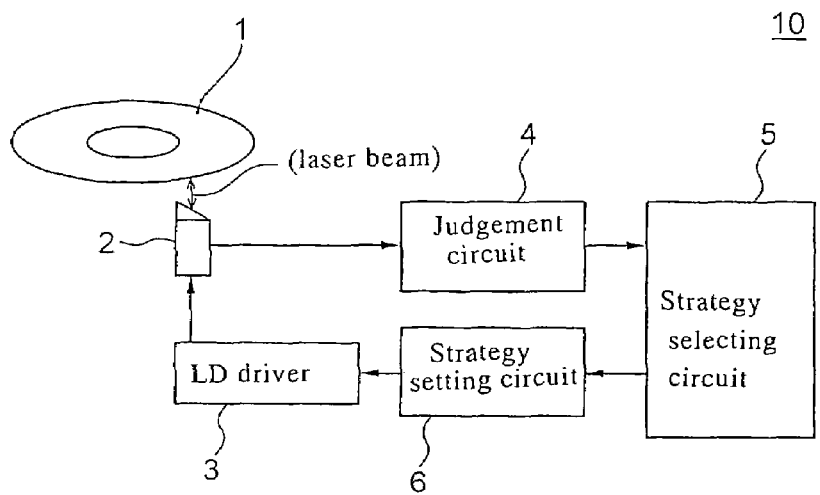
FIG. 9 is a block diagram of an information recording device according to an embodiment of the present invention.

FIG. 9 shows the configuration of an optical disk drive using the recording condition setting method of the present invention. The optical disk drive 10 includes an optical head 2 having a laser device (LD), an LD driver 3, a judgement circuit 4, strategy selection circuit 5, and a strategy setting circuit 6. The optical head 2 irradiates an optical disk 1 with laser beam, to read/write data on the optical disk. The LD driver 3 drives the laser device within the optical head 2 by using the recording strategy set by the strategy setting circuit 6. The judgement circuit 4 judges pass or fail of the recording condition for use in recording on the optical disk. The strategy selection circuit 5 instructs the strategy setting circuit 6 to use the recording strategy for recording on the optical disk 1 based on the judgement by the judgement circuit 4.

In the optical disk drive 10, upon recording data, a signal from a format controller not shown is fed to a data modulation circuit not shown for modulation of data. The strategy setting circuit 6 drives the laser device in the optical head 2 via the LD driver 3 by the strategy set to provide suitable recording/reproducing operation, whereby modulated data are recorded on the optical disk 1. Upon setting the recording strategy, the reproduced signal from the optical disk 1 is fed to the judgement circuit 4 through a reproducing amplifier not shown, whereby the judgement circuit 4 judges whether or not recording is suitably performed. Based on the judgement result by the judgement circuit 4, the strategy selection circuit 5 performs selection of the strategy.

Figure 10:
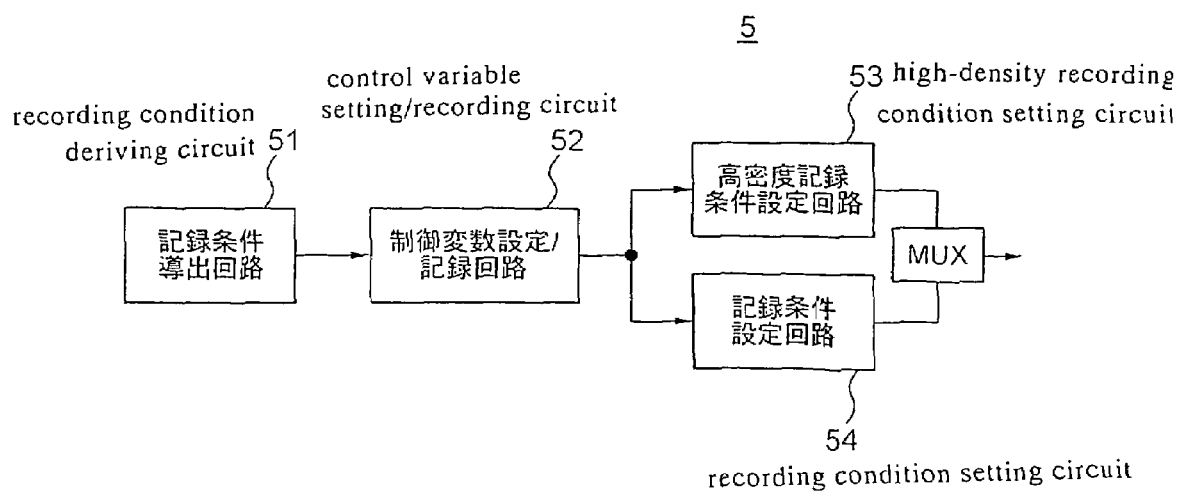
FIG. 10 is a block diagram showing the detail of the configuration of the strategy selection circuit shown in FIG. 9.

FIG. 10 shows the detailed configuration of the strategy selection circuit 5. The strategy selection circuit 5 includes a recording condition deriving circuit 51, a control variable setting/storage circuit 52, a higher-density recording condition setting circuit 53, and a recording condition setting circuit 54. The recording condition deriving circuit 51 determines the recording condition based on the procedure as described above in connection with the above embodiments. The control variable setting/storage circuit 52 performs selection of the strategy control variables for providing suitable recording, based on the judgement by the judgement circuit 4, and storage and determination thereof. The higher-density recording condition setting circuit 53 determines by inference interpolation the recording strategy of the record mark, for which each parameter of the recording strategy cannot be determined directly by using the reproduced signal due to a higher recording density. The recording condition setting circuit 54 determines the recording strategy of the record marks for which the each parameter of the recording strategy can be determined directly by using the reproduced signal.

It is to be noted that the specified record pattern recorded on the optical disk in the above embodiments need not include all of the constituent record marks, and it is sufficient that at least one any record mark among the record marks which are 2T or more longer than the shortest mark be included therein. In addition, the combinations of the change of parameters in the recording power and the recording strategy may be other than the combinations shown FIG. 2. The range of combinations or changes may be arbitrarily determined.

Hereinafter, an embodiment will be described wherein determination of the recording condition is implemented by a microcomputer mounted on the optical disk drive. Here, an example will be described with reference to selection of the top width Ttop among the parameters of the recording strategy. In addition, since the parameters of the recording strategy used for the record marks ($\geq$4T marks) which are not shorter than the 4T mark may be same as the parameters for the 4T mark, the description assumes that the parameters of $\geq$4T marks are same as the parameters of 4T mark.

Figure 11:
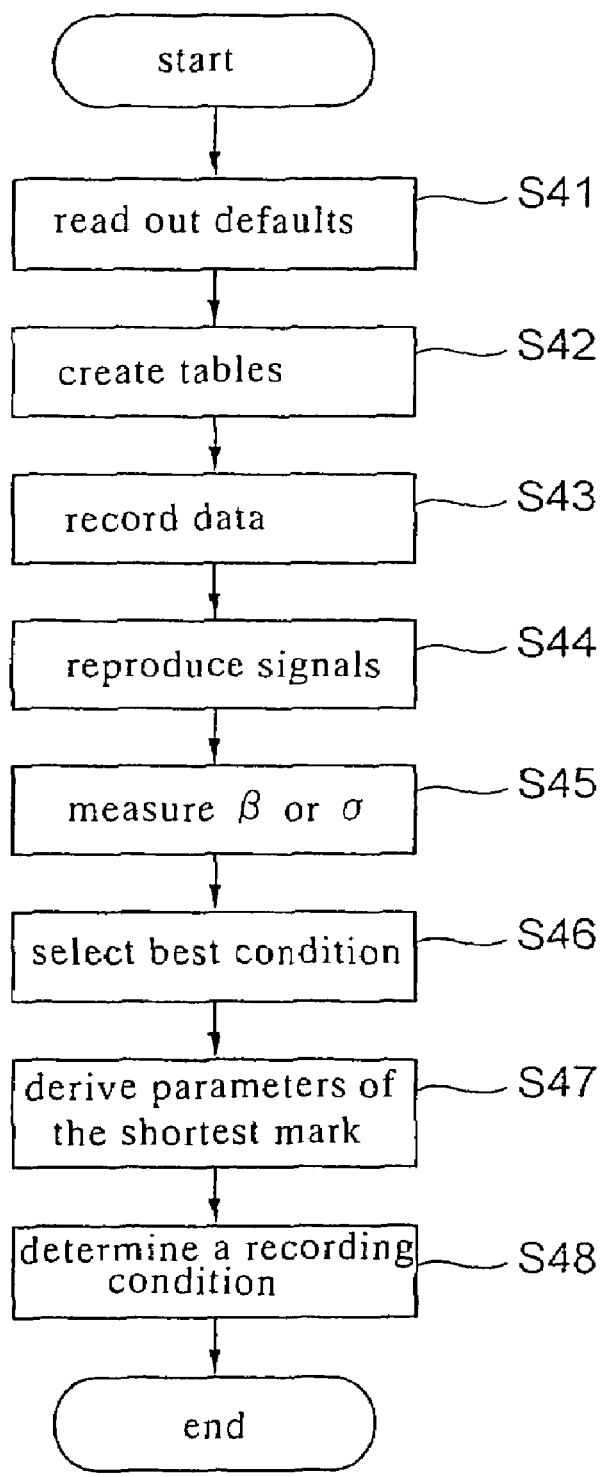
FIG. 11 is a flowchart showing the flow of a procedure in the program selecting the recording condition in the procedure similarly to the procedure shown in the flowchart depicted in FIG. 1.

FIG. 11 shows in a flowchart the procedure of a program for selecting the recording condition in the procedure similar to the procedure shown in the flowchart shown in FIG. 1. In the optical disk drive, the top width Ttop is determined by the control by the controller which implements the functions corresponding to the judgement circuit 4, strategy setting circuit 5, and strategy setting circuit 6. The controller moves the optical head mounting thereon the laser device etc. to the PCA of the optical disk, and read out the defaults of the recording condition from the optical disk drive or the optical disk (step S41). The controller creates a recording condition table to be used for recording the specified record pattern including at least the 3T mark and the 4T mark at a plurality of recording conditions based on the defaults thus read out (step S42).

FIGS. 12A and 12B exemplify the recording condition tables created in step S42. In these drawings, "×1" for the initial value of the relative power means the recording power which is equal to "default×1", the default being read out in step S41. In addition, the unit of the values for the items other than the relative power in the table is the channel clock T, and "–" in the table means that the value same as the value of the adjacent upper column is used in the column. In step S42, for example, the recording condition tables are created wherein values for parameters of the selected subject are changed within the specified range, with the defaults read in step S41 being the initial values.

In step S42, as shown in FIG. 12A, a recording condition table including five recording conditions 11 to 15 is created wherein the top width 3Ttop of the 3T mark is changed from the initial value (0.5T) within the range of ±0.1T, i.e., within the range between 0.4T and 0.6T with a 0.05T step difference, whereas other parameters used are same as the initial values. In addition, as shown in FIG. 12B, a recording condition table including five recording conditions 21 to 25 is created wherein the top width 4Ttop of the 4T mark (more than 4T mark) is changed from the initial value (0.6T) within the range of ±0.1T, i.e., within the range between 0.5T and 0.7T with a 0.05T step difference, whereas other parameters used are same as the initial values.

Back to FIG. 11, the controller records the specified record pattern on the optical disk (step S43), while changing the recording condition with reference to the recording condition table created in step 42. Assuming that the recording condition tables shown in FIGS. 12A and 12B are created in step S42, the specified record pattern is recorded with 25 (5×5) different recording conditions obtained by combining the recording conditions 11 to 15 shown in the table of FIG. 12A and the recording conditions 21 to 25 shown in the table of FIG. 12B. In step S43, first, the specified record pattern is recorded, for example, under the five different recording conditions obtained by combining the condition 11 and the conditions 21 to 25, and then the specified record pattern is recorded under each five different conditions obtained by combining each of the conditions 12 to 15 and the conditions 21 to 25.

The controller reproduces the specified record pattern recorded on the optical disk (step S44), to measure the β value or jitter a upon reproducing the marks other than the shortest mark included in the specified record pattern (step S45). The controller selects based on the measured β value or the jitter σ the recording condition which enables best reproduction of the specified record pattern, for each of the record marks other than the shortest mark, as a selected recording condition (step S46). In step S46, the parameters for recording the 3T mark and the 4T or more than 4T mark are selected from the recording condition tables such as shown in FIGS. 12A and 12B.

Subsequently, the parameters for recording the shortest mark are derived based on the parameters obtained in step S46 for recording the record marks longer than the shortest mark (step S47). In step S47, similarly to the first embodiment, the top width 2Ttop of the shortest mark 2T is calculated based on the top width 3Ttop of the 3T mark and the top width 4Ttop of the 4T mark. The controller determines the recording condition selected in step S46 and the parameters determined in step S47 for recording the shortest mark, as the recording condition for recording data, thereby recording the recording condition in the specified area of the optical disk (step S48). By using the program defining such a procedure, the optical disk drive can select with ease the recording condition including parameters for recording the shortest mark, similarly to the first embodiment.

In the above embodiment, although the specified record pattern is recorded with the recording power being fixed, the specified record pattern may be recorded by using a plurality of recording powers by creating a plurality of recording condition tables including different relative powers (FIGS. 12A and 12B), in step S42. Here, if the parameters which enable best reproduction are determined for respective recording powers, the parameters which enable best reproduction of the specified record pattern have a certain area, similarly to the case shown in FIG. 3. In this case, it is preferable that the median of the area be used as the parameters for recording record marks longer than the shortest mark, and based on the parameters, parameters for recording the shortest mark be derived.

Figure 13:
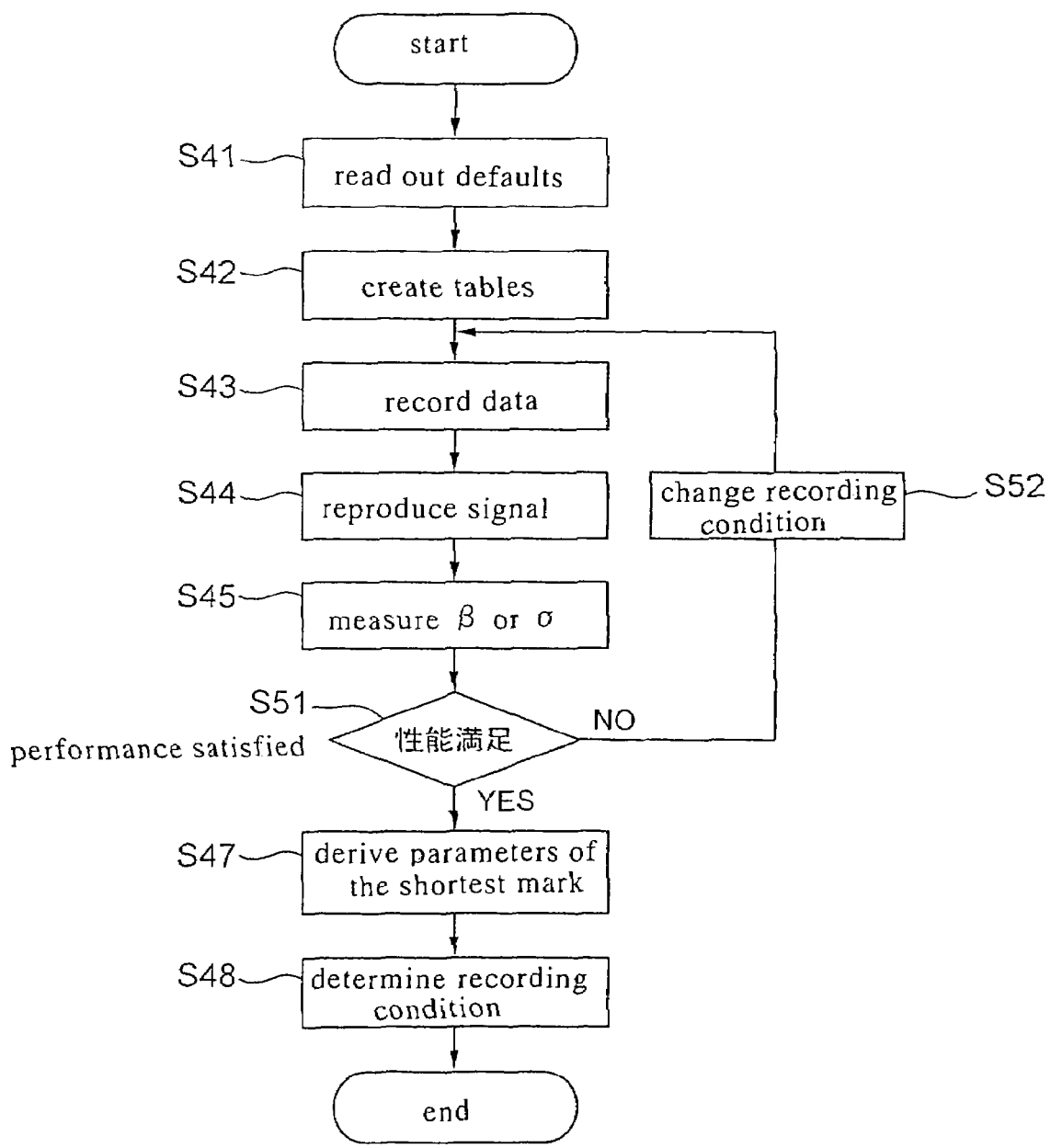
FIG. 13 is a flowchart showing the procedure of a program modified from the program having the procedure depicted in FIG. 11.

FIG. 13 shows in a flowchart the procedure of a program obtained by modifying a part of the program having the procedure shown in FIG. 11. In this example, the controller records the specified record pattern on the optical disk with the combination of part of the recording condition tables, and reads the recorded specified record pattern to measure the $\beta$ value or jitter $\sigma$. In this example, the technique for determining parameters for the shortest mark is employed, wherein if the measured $\beta$ value or jitter $\sigma$ does not satisfy the specified performance, the specified record pattern is recorded while changing the recording condition by selecting a combination of the recording conditions other than the combinations of the recording conditions already used, until the measure $\beta$ value or jitter $\sigma$ satisfies the specified performance, or until recording the specified record pattern with all of the possible combinations in the recording condition tables is completed.

The controller reads the defaults of the recording condition in step S41, and creates the recording condition tables in step S42, similarly to the procedure shown in FIG. 11. The controller records the specified record pattern on the optical disk in step S43 by using only some of the combinations of the recording conditions in the recording condition tables created in step S42. For example, if the recording condition tables created in step S42 are such that shown in FIGS. 12A and 12B, the controller uses nine different combinations of the recording conditions obtained by combining three conditions 11 to 13 (FIG. 12A) and three conditions 21 to 23 (FIG. 12B), to record the specified record pattern on the optical disk.

The controller reproduces the recorded specified record pattern in step S44, to measure the $\beta$ value or jitter $\sigma$ of the reproduced signal in step S45. The controller judges whether or not the $\beta$ value ($\beta$0) or jitter ($\sigma$0) of the recording condition allowing the best reproduction of the specified record pattern satisfies the specified performance (step S51). More specifically, if the $\beta$0 value or jitter $\sigma$0 satisfies the specified performance, the controller advances to step S47 to calculate the parameters for recording the shortest mark, and determine the recording condition in step S48.

The controller, if judges that the $\beta$0 or $\sigma$0 does not satisfy the specified performance, temporarily stores the value for $\beta$0 or $\sigma$0 and the corresponding recording condition, sets the recording condition to be used for recording the specified recording pattern in step S43 of the next loop to a combination not yet used among the combinations of the recording condition tables created in step S42 (step S52), and returns to step S43 to iterates the steps S43 to S51. In step S52, the recording condition to be used for recording the specified record pattern in step S43 of the next loop is set to ten different combinations of conditions 11 to 15 (FIG. 12A) and conditions 24 and 25 (FIG. 12B), for example.

The controller uses the plurality of recording conditions determined in step S52 to record again the specified record pattern in step S43, measuring the $\beta$ value or jitter $\sigma$ of the reproduced signal. The controller judges in step S51 whether or not the $\beta$0 or $\sigma$0 of the current loop satisfies the specified performance. The controller, if judges that the $\beta$0 or a $\sigma$0 satisfies the specified performance, advances to step S47 to determine the parameters for recording the shortest mark.

The controller, if judges that the $\beta$0 or $\sigma$0 of the current loop does not satisfy the specified performance, compares the $\beta$0 or $\sigma$0 of the previous loop and the $\beta$0 or $\sigma$0 of current loop to store one of the $\beta$0s or $\sigma$0s which provides better reproduction of the specified record pattern and again advances to step S52, wherein the recording condition to be used for recording the specified record pattern in step S43 of the next loop is set at a combination not yet used. The controller iterates operation of step S43 to step S51 until the controller judges in step S51 that the $\beta$0 or $\sigma$0 satisfies the specified performance or until there is no remaining combination of the recording conditions to be set in step S52, i.e., until the specified record pattern is recorded with all of the possible combinations of the recording condition tables.

In the example of FIG. 13, since the recording condition satisfying the specified performance can be detected before the specified record pattern is recorded with all of the possible combinations of the recording condition tables, the time length for determining the recording condition can be reduced compared to the example shown in FIG. 11. In addition, since the number of the specified record patterns recorded on the optical disk for determining the recording condition can be reduced, a large area is not needed for recording the specified record pattern on the recording medium.

In addition, in the example shown in FIG. 13, if the recording condition tables shown in FIGS. 12A and 12B and other recording condition tables which are different from FIGS. 12A and 12B only in the relative power are created, the step S43 in the first loop may be such that the specified record pattern is recorded with the combinations (25 combinations) of the recording condition tables shown in FIGS. 12A and 12B, and the step S43 in the second loop may be such that the specified record pattern is recorded with the combinations (25 combinations) of the recording condition tables which are different from FIGS. 12A and 12B in the relative power. In such a case, the selection of the top width Ttop and the selection of the recording power can be performed at the same time.

Figure 14:
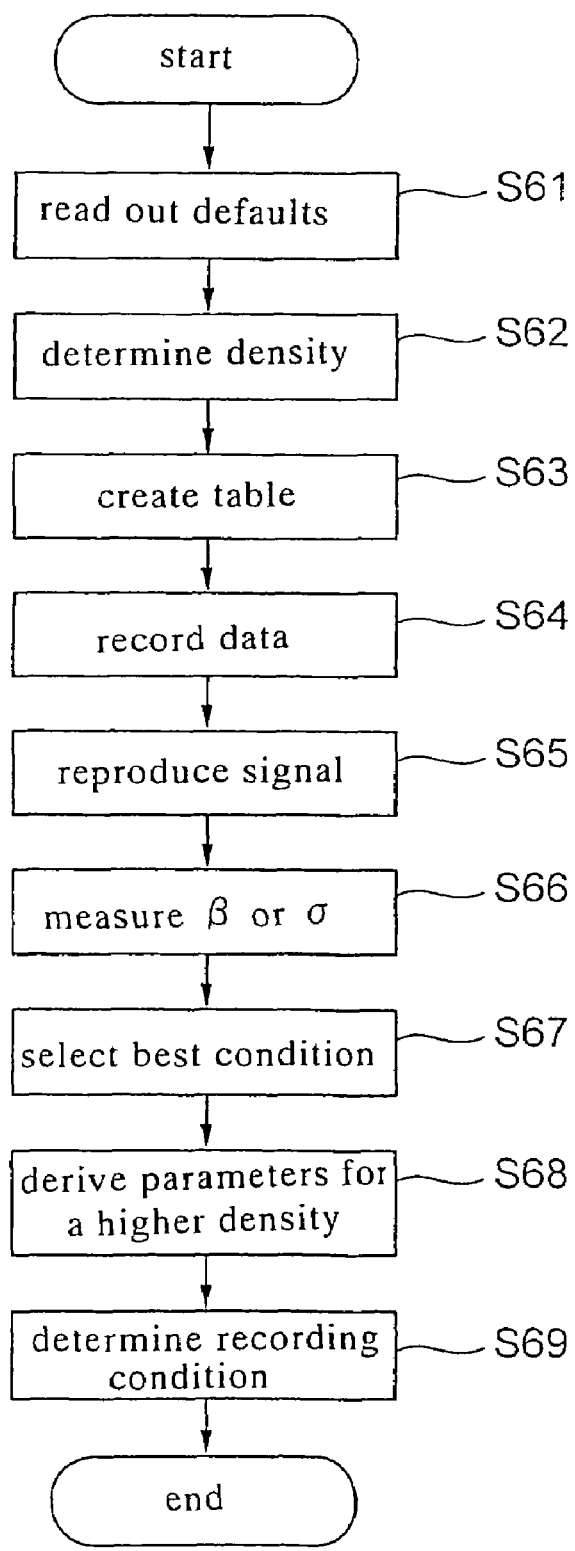
FIG. 14 is a flowchart showing the procedure of the program selecting the recording condition in the procedure similar to the procedure of the flowchart depicted in FIG. 5.

FIG. 14 shows in a flowchart the procedure of a program for selecting the recording condition in the procedure similar to the procedure shown in FIG. 5. The controller moves the optical head to the PCA of the optical disk, and read the defaults of the recording condition from the optical disk drive or the optical disk (step S61). If recording conditions corresponding to a plurality of recording densities are recorded on the optical disk drive or the optical disk, step S61 may be such that the defaults of the recording conditions are read out for the respective recording densities.

The controller determines a plurality of recording densities for use in recording the specified record pattern including at least 2T mark, 3T mark and 4T mark on the optical disk. The recording densities thus determined are lower than the normal recording density, and accordingly, the $\beta$ value or jitter $\sigma$ can be suitably measured from the reproduced signal of the 2T mark at any of the recording densities. In step S62, for example, the recording densities are determined so that the 2T mark length corresponds to Lp2, Lp1 and Lp0 (Lp2>Lp1>Lp0>Lmin), wherein Lmin is the 2T mark length at the recording density used in the normal recording operation.

In step S63, a recording condition table including five different recording condition 31 to 35 such as shown in FIG. 15A is created, wherein the top width 2Ttop of the 2T mark is changed within the range of ±0.1T from the initial value (0.6T), i.e., within the range between 0.5T and 0.7T, with a 0.05T step difference, whereas other parameters are same as the initial value. In addition, a recording condition table including five different recording conditions 41 to 45 such as shown in FIG. 15B is created, wherein the top width 3Ttop of the 3T mark is changed within the range of ±0.1T from the initial value (0.6), i.e., within the range between and 0.5T and 0.005T step difference, whereas other parameters are same as the initial value. Furthermore, a recording condition table including five different recording conditions 51 to 55 such as shown in FIG. 15C is created, wherein the top width of 4Ttop of the 4T mark is changed within the range of ±0.1T from the initial value (0.6T) with a 0.05T step difference, whereas other parameters are same as the initial value.

The controller records the specified record pattern on the optical disk while changing the recording condition for each of the plurality of recording densities set in step S62, with reference to the recording condition tables created in step S63. If the recording condition tables shown in FIGS. 15A, 15B and 15C are created in step 63, then the specified record pattern is recorded with 5×5×5=125 different recording conditions obtained by combining each of the five different conditions 31 to 35 in the table of FIG. 15A, each of the five different conditions 41 to 45 in the table of FIG. 5B and each of the five different conditions 51 to 55 in the table of FIG. 5C.

In step S64, if three recording densities are set in step S62 wherein the 2T mark length corresponds to Lp2, Lp1 and Lp0, the specified record pattern is first recorded with 125 different recording conditions at a recording density wherein the 2T mark length corresponds to Lp2. Subsequently, the specified record pattern is recorded at a recording density wherein the 2T mark length corresponds to Lp1 with 125 different recording conditions as described above, and the specified record pattern is recorded at a recording density wherein the 2T mark length corresponds to Lp0 with 125 different recording conditions as described above.

In this case, 125×3 different specified record patterns are recorded on the optical disk. The controller reproduces the specified record pattern recorded on the optical disk (step S65), to measure the β value or jitter σ of the specified record pattern thus reproduced for each of the recording densities (step S66). The controller selects the recording condition allowing the best reproduction of the specified record pattern based on the measured β value or jitter σ for each of the recording densities, as a selected recording condition (step S67). In step S67, the top width 2Ttop(2) of the 2T mark, the top width 3Ttop(2) of the 3T mark and the top width 4Ttop(2) of the 4T mark in the recording density wherein the 2T mark length corresponds to Lp2 are selected, then the top width 2Ttop(1) of the 2T mark, the top width 3Ttop(1) of the 3T mark and the top width 4Ttop(1) of the 4T mark in the recording density wherein the 2T mark length corresponds to Lp1 are selected, and the top width 2Ttop(0) of the 2T mark, the top width 3Ttop(0) of the 3T mark and the top width 4Ttop(0) of the 4T mark in the recording density wherein the 2T mark length corresponds to Lp0 are selected.

Subsequently, the parameters of the recording density of the normal recording operation which is higher than the recording densities used for recording the specified record pattern in step S64 are determined based on the parameters in the plurality of the recording densities which are lower than the normal recording density and determined in step S66 (step S68). In step S68, the top width 4Ttop of the 4T mark for the normal recording density is determined by inference interpolation based on the 4Ttop(2), 4Ttop(1) and 4Ttop(0) determined in step S67. Similarly, the top width 3Ttop of the 3T mark for the normal recording density is determined by inference interpolation based on the 3Ttop (2), 3Ttop(1) and 3Ttop(0) determined in step S67. Moreover, the top width 2Ttop of the 2T mark for the normal recording density is determined by inference interpolation based on the 2Ttop(2), 2Ttop(1) and 2Ttop(0) determined in step S67.

The controller sets the recording condition obtained in step S68 to a recording condition for recording data therewith, and records the recording condition thus set in a specified area of the optical disk (step S69). By using the program defining such a procedure of operation, the optical disk drive can select with ease the recording condition including the parameters for recording the shortest mark at the normal recording density.

Again in this example, similarly to the example of FIG. 11, the specified record pattern may be recorded at a plurality of recording powers while creating a plurality of recording condition tables having different relative powers (FIGS. 12A and 12B). In this case, if the parameters of the recording strategy allowing the best reproduction of the specified record pattern are determined for each of the recording powers, the parameters allowing the best reproduction of the specified record pattern has a specified area, similarly to those shown in FIG. 8. In this case, the median of the area is employed as a representative value to calculate the parameters of the normal recording density.

Figure 16:
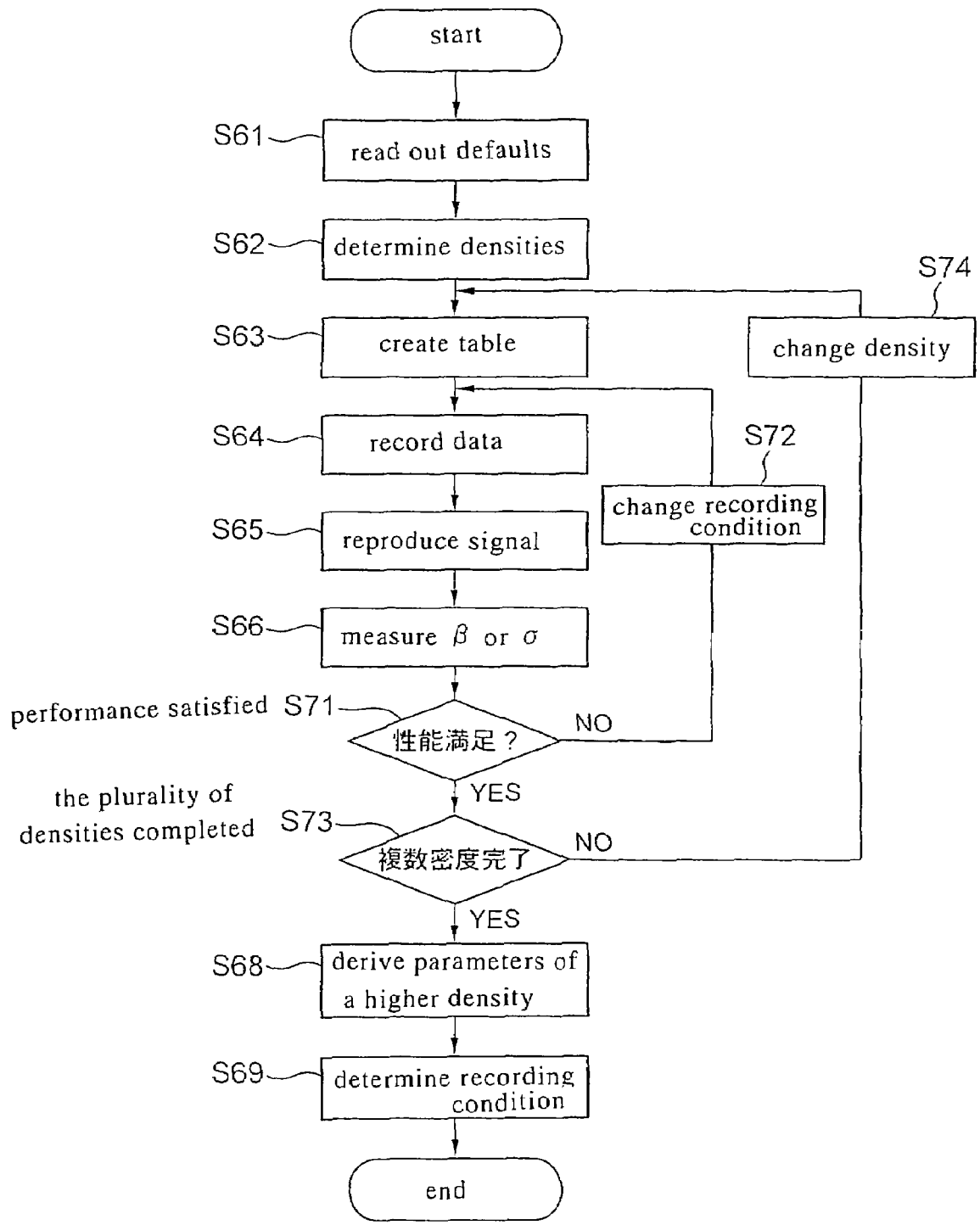
FIG. 16 is a flowchart showing an example of the procedure of a program modified from the program having the procedure depicted in FIG. 14.

FIG. 16 shows in a flowchart an example of the procedure of a program modified from the program having the procedure shown in FIG. 14. In this example, similarly to the example of FIG. 13, the controller records the specified record pattern on the optical disk with some of the combinations of the recording condition tables, reads the specified record pattern thus recorded to measure the β value or jitter σ. In this example, the technique for determining parameters for the normal recording density is employed, wherein if the measured β value or jitter σ does not satisfy the specified performance, the specified record pattern is recorded while changing the recording condition by selecting a combination of the recording conditions other than the combinations of the recording conditions already used, until the measured β value or jitter σ satisfies the specified performance, or until the recording of the specified record pattern with all of the possible combinations in the recording condition tables is completed.

The controller, similarly to the procedure shown in FIG. 14, reads the defaults of the recording condition in step S61, setting a plurality of recording densities in step S62, and creates the recording condition tables in step S63. The controller records the specified record pattern on the optical disk at one of the plurality of recording densities set in step S62. Upon this step, the controller uses only some of the combinations of the recording conditions in the recording condition tables created in step S63 For example, if the recording condition tables are those shown in FIGS. 15A, 15B and 15C, the controller records the specified record pattern with the total of 27 different combinations of the recording conditions obtained by combining three different recording conditions 31 to 33 (FIG. 15A), three different recording conditions 41 to 43 (FIG. 15B) and three different recording conditions 51 to 53 (FIG. 15C).

The controller reproduces the specified record patterns thus recorded in step S65, and measures the β values or jitters σ of the reproduced signals in step S66. The controller judges whether or not the β value (β0) or jitter σ (σ0) of the recording condition allowing the best reproduction of the specified record pattern among the measured β values or jitters satisfies the specified performance (step S71). More specifically, the controller judges whether or not the reproduced signal corresponding to the recording condition allowing the best reproduction of the specified record pattern among the recording conditions used for recording in step S64 satisfies the specified performance. The controller, if judges that the β0 value or jitter σ0 does not satisfy the specified performance, temporarily stores value of β0 or σ0 and the recording condition corresponding to the β0 or σ0 in a memory, changes the recording condition for recording the specified record pattern in step S64 of the next loop to a combination of the recording conditions not yet used among the combinations of the recording condition tables created in step S63 (step S72), and returns to step S64 to iterate the operation of steps S64 to S71.

In step S72, the recording conditions to be used for recording the specified record pattern in step S64 of the next loop are set to different combinations obtained by combining conditions 31 to (FIG. 15A), conditions 44 and 45 (FIG. 15B) and conditions 54 and 55 (FIG. 15C). The controller again records the specified record pattern in step S64 by using the plurality of recording conditions set in step S72, to measure the β value and jitter σ of the reproduced signal therefrom. The controller judges in step S71 whether or not the β0 or σ0 in current loop satisfies the specified performance.

The controller, if judges that the β0 or σ0 satisfies the specified performance, judges whether or not there is a remaining recording density for which the specified record pattern is not yet recorded among the plurality of recording densities set in step S62 (step S73). The controller, if judges that there is a remaining recording density not yet used for recording the specified record pattern, changes the recording density to a recording density not yet used for recording the specified record pattern among the recording densities set in step S62 (step S74), and returns to step S63 to iterate the operation of steps S63 to S66 and steps S71 and S72.

If it is judged in step S73 that there is no recording density not yet used for recording the specified record pattern, the process advances to step S68 to determine parameters of the normal recording density. In this manner, the controller iterates the steps S63 to S71 while changing the recording condition and recording density for all of the recording densities set in step S62 until the recording condition where the β0 or σ0 satisfies the specified performance is obtained. In this example, since the recording condition satisfying the specified condition can be found before recording the specified recording pattern by using all of the combinations in the recording condition tables, similarly to the example of FIG. 13, the time length for determining the recording condition can be reduced compared to the example of FIG. 14. In addition, since the number of specified recording patterns recorded on the optical disk for determining the recording condition can be reduced, the area for recording the specified recording pattern on the recording medium may be moderate without using a large area.

In the embodiments described with reference to FIGS. 11 to 16, the top width Ttop is exemplarily determined; however, in an alternative of or in addition to this, other parameter or parameters may be determined. For example, in FIG. 11, if a plurality of parameters are to be selected, the steps S42 to S47 should be preferably iterated for the plurality of parameters to be selected. More concretely, both the top width Ttop and rear edge cooling width Tcl will be described hereinafter in an example according to the procedure shown in FIG. 11. In this case, first, as to the parameters except for the top width Ttop, the defaults read out in step S41 are used in step S42 in the first loop, and a recording condition table is created wherein the top width Ttop is changed, to thereby selecting the top width Ttop. Then, a recording condition table, wherein the rear edge cooling width is changed with the top width Ttop being the value selected in the first loop, is created in step S42 of the second loop. By using such a procedure, both the top width Ttop and rear edge cooling width Tcl can be selected.

Although the present invention is described with reference to the preferred embodiments thereof, the recording condition setting method, information recording device using the same and program according to the present invention is not limited to the above embodiments and various modifications or alterations made from the above embodiments fall within the scope of the present invention.

The invention claimed is:

1. A method for setting a recording condition on an information recording medium, comprising:
   recording under a plurality of recording conditions a first test mark which is one unit-record-length longer than a shortest mark among modulating codes used for information recording, and selecting a first recording condition based on a plurality of reproduced signals obtained by reproducing said recorded first test mark;
   recording under a plurality of recording conditions at least one second test mark which is selected from marks which are two or more unit-record-lengths longer than said shortest mark and not longer than a longest mark, and selecting a second recording condition based on a plurality of reproduced signals obtained by reproducing said at least one recorded second test mark; and
   determining a recording condition of said shortest mark based on said first and second recording conditions.

2. The method for setting a recording condition on an information recording medium according to claim 1, wherein an amplitude reproduced from said shortest mark is not larger than 10% of an amplitude reproduced from said longest mark.

3. The method for setting a recording condition on an information recording medium according to claim 1, wherein jitters in said reproduced signals including a reproduced signal from said shortest mark is not smaller than 15%.

4. The method for setting a recording condition according to claim 1, wherein said plurality of recording conditions are determined by changing at least one of laser power of recording laser, top pulse width, intermediate pulse width, rear edge pulse width and rear edge cooling width.

5. The method for setting a recording condition according to claim 1, wherein said first and second recording conditions are selected based on asymmetries or jitters in said reproduced signals.

6. The method for setting a recording condition according to claim 1, wherein said shortest mark satisfies the following relationship:

shortest mark length≧(α/d)×λ×(4×NA)

defined by a numerical aperture NA of a focusing lens for forming an optical spot on said information recording medium, light source wavelength λ, substrate thickness d of said information recording medium, and constant α (where 1.0<α/d<1.2).

7. The method for setting a recording condition according to claim 1, wherein said numerical aperture NA is 0.6 to 0.7, said light source wavelength λ is 390 to 410 nm, said substrate thickness of the optical disk for recording thereon is 0.6 mm, and the lower limit of said shortest mark length is 145 nm.

8. The method for setting a recording condition according to claim 1, wherein said numerical aperture NA is 0.7 to 0.85, said light source wavelength λ is 390 to 410 nm, said substrate thickness of the optical disk for recording thereon in 0.1 mm, and the lower limit of said shortest mark length is 120 nm.

9. The method for setting a recording condition on an information recording medium according to claim 1, wherein an amplitude reproduced from said shortest mark is not larger than 10% of an amplitude reproduced from said longest mark;
wherein jitters in said reproduced signals including a reproduced signal from said shortest mark is not smaller than 15%;
wherein said plurality of recording conditions are determined by changing at least one of laser power of recording laser, top pulse width, intermediate pulse width, rear edge pulse width and rear edge cooling width; and
wherein said first and second recording conditions are selected based on asymmetries or jitters in said reproduced signals.

10. A method for setting a recording condition on an information recording medium, comprising:
recording one or more test marks including at least a shortest mark at a plurality of recording densities lower than a recording density of a normal recording operation;
reproducing said recorded test marks, to find a recording condition providing a suitable reproducing signal for each of said recording densities based on asymmetry or an absolute value of jitter; and
determining a recording condition for recording at least said shortest mark at said recording density of said normal recording operation, based on said plurality of recording densities and said recording condition providing said suitable reproduced signal.

11. The method for setting a recording condition according to claim 10, wherein said plurality of recording densities be obtained by using at least one of a channel clock which has a period longer than a channel clock used in said normal recording operation, and a linear velocity which is higher than a linear velocity of the recording medium used in said normal recording operation.

12. The method for setting a recording condition according to claim 10, wherein an amplitude reproduced from said shortest mark is not larger than 10% of an amplitude reproduced from a longest mark for said recording density of said normal recording operation, and wherein an amplitude reproduced from said shortest mark is not smaller than 10% of an amplitude reproduced from said longest mark for each of said plurality of recording densities lower than said recording density of said normal recording operation.

13. The method for setting a recording condition according to claim 10, wherein said recording condition of said shortest mark is obtained by approximation using a quadratic function.

14. The method for setting a recording condition according to claim 10, wherein said shortest mark satisfies the following relationship:

shortest mark length≧(α/d)×λ×(4×NA)

defined by a numerical aperture NA of a focusing lens for forming an optical spot on said information recording medium, light source wavelength λ, substrate thickness d of said information recording medium, and constant α (where 1.0<α/d<1.2).

15. The method for setting a recording condition according to claim 10, wherein said numerical aperture NA is 0.6 to 0.7, said light source wavelength λ is 390 to 410 nm, said substrate thickness of the optical disk for recording thereon is 0.6 mm, and the lower limit of said shortest mark length is 145 nm.

16. The method for setting a recording condition according to claim 10, wherein said numerical aperture NA is 0.7 to 0.85, said light source wavelength λ is 390 to 410 nm, said substrate thickness of the optical disk for recording thereon in 0.1 mm, and the lower limit of said shortest mark length is 120 nm.

17. The method for setting a recording condition according to claim 10, wherein said plurality of recording densities be obtained by using at least one of a channel clock which has a period longer than a channel clock used in said normal recording operation, and a linear velocity which is higher than a linear velocity of the recording medium used in said normal recording operation;
wherein an amplitude reproduced from said shortest mark is not larger than 10% of an amplitude reproduced from a longest mark for said recording density of said normal recording operation, and wherein an amplitude reproduced from said shortest mark is not smaller than 10% of an amplitude reproduced from said longest mark for each of said plurality of recording densities lower than said recording density of said normal recording operation;
wherein said recording condition of said shortest mark is obtained by approximation using a quadratic function;
and wherein said shortest mark satisfies the following relationship:

shortest mark length≧(α/d)×λ×(4×NA)

defined by a numerical aperture NA of a focusing lens for forming an optical spot on said information recording medium, light source wavelength λ, substrate thickness d of said information recording medium, and constant α (where 1.0<α/d<1.2).

18. An information recording device for optically recording information on an information recording medium, comprising:
a recording condition setting means for setting a recording condition upon recording information on said information recording medium;
a recording means for recording a first test mark and at least one second test mark by using a plurality of recording conditions set by said recording condition setting means, said first test mark being one unit-record-length longer than a shortest mark among modulating codes used for information recording, said second test mark being two or more unit-record-lengths longer than said shortest mark and not longer than a longest mark;

a reproducing means for reproducing said first test mark and said second test mark from said information recording medium to generate reproduced signals; and a signal processing means for selecting a first recording condition based on said reproduced signals of said first test mark and a second recording condition based on said reproduced signals of said second test mark;

said recording condition setting means setting a recording condition of said shortest mark based on said first recording condition and said second recording condition selected by said signal processing means.

19. An information recording device for optically recording information on an information recording medium, comprising:

a recording means for recording one or more test mark including at least a shortest mark at a plurality of recording densities lower than a recording density of a normal recording operation;

a reproducing means for reproducing said test mark recorded by said recording means to generate reproduced signals;

a signal processing means for determining a recording condition providing a suitable reproduced signal among said reproduced signals for each of said plurality of recording densities based on asymmetry or an absolute value of jitter; and a recording condition setting means for setting a recording condition for recording at least said shortest mark at said recording density of said normal recording operation, based on said plurality of recording densities and said recording density providing said suitable reproduced signal.

20. A program provided in a computer readable medium for setting a recording condition for recording information on an information recording/reproducing medium, said program defining:

a step of setting a plurality of test recording conditions based on an initial recording condition set in advance for said information recording medium or an information recording/reproducing device;

a step of recording signals under each of said set test recording conditions by using data including a test mark (first test mark) which is one unit-record-length longer than a shortest mark among modulating codes used for information recording and a test mark (second test mark) which is two or more unit-record-lengths longer than said shortest mark and not longer than a longest mark;

a step of reproducing said recorded signals to detect asymmetries or jitters in said reproduced recorded signals;

a step of extracting a recording condition for each of said first test mark and said second test mark based on said asymmetries or absolute values of said jitters detected for each of said test recording conditions; and a step of determining a recording condition of said shortest mark based on said recording conditions obtained for said first test mark and said recording condition obtained for said second test mark.

21. A program provided in a computer readable medium for setting a recording condition for recording information on an information recording/reproducing medium, said program consecutively defining:

a first step of selecting a plurality of test recording conditions based on an initial recording condition set in advance for said information recording medium or an information recording/reproducing device;

a second step of recording signals under each of said selected test recording conditions by using data including a record mark (first test mark) which is one unit-record-length longer than a shortest mark among modulating codes used for information recording and at least one record mark (second test mark) which is two or more unit-record-lengths longer than said shortest mark and not longer than a longest mark;

a third step of reproducing said recorded signals to detect asymmetries of jitters of reproduced signals thus reproduced;

a fourth step of judging pass or fail of each of said test recording conditions based on an asymmetry or an absolute value of jitter detected for each of said test recording conditions, to return to said second step to re-select said test recording condition if there is no test recording condition judged to pass for one of said first test mark and said second test mark, or to advance to a next step if there is a test recording condition judged to pass for any of said first test mark and said second test mark; and a fifth step of determining a recording condition of said shortest mark based on said test recording condition obtained for said first test mark and judged to pass, and said test recording condition obtained for said second test mark and judged to pass.

22. A program provided in a computer readable medium for setting a recording condition for recording information on an information recording/reproducing medium, said program defining:

a step of setting a plurality of recording densities lower than a recording density of a normal recording operation;

a step of selecting a plurality of test recording conditions for each of said plurality of recording densities based on an initial recording condition set in advance for said information recording medium or an information recording/reproducing device;

a step of recording under each of said selected test recording conditions a signal including a mark having a specified number of unit-record-lengths;

a step of reproducing said recorded signal for each of said plurality of recording densities to detect an asymmetry or jitter of the reproduced signal thus reproduced;

a step of selecting a test recording condition for said mark having said specified number of unit-record-lengths for each of said recording densities based on said asymmetry or an absolute value of said jitter detected for each of said recording conditions; and a step of setting a recording condition for recording said mark having said specified number of unit-record-lengths at said recording density of said normal recording operation based on said plurality of recording densities and said test recording condition selected for each of said recording densities.

23. A program provided in a computer readable medium for setting a recording condition for recording information on an information recording/reproducing medium, said program consecutively defining:

a first step of setting one of a specified number of recording densities lower than a recording density of a normal recording operation;

a second step of selecting a plurality of test recording conditions based on an initial recording condition, which is set in advance for said information recording medium or an information recording/reproducing device, or based on a corrected recording condition;

a third step of recording under each of said selected test recording conditions a signal including a mark having a specified number of unit-record-lengths;

a fourth step of reproducing said recorded signals to detect asymmetries or jitters of reproduced signals thus reproduced;

a fifth step of judging pass or fail of each of said test recording conditions based on asymmetry or jitter detected for each of said test recording conditions, to return to said second step to re-select said test recording condition if there is no test recording condition judged to pass for any of said first test mark and said second test mark, to return to said first step to select another of said recording densities if there is a test recording condition judged to pass for any of said first test mark and said second test mark and if selection of all of said specified number of recording densities is not completed, or to advance to a next step if there is a test recording condition judged to pass for any of said first test mark and said second test mark and if selection of all of said specified number of recording densities is completed; and a sixth step of determining a recording condition for recording said mark having said specified number of unit-record-length at said recording condition of said normal recording operation based on said specified number of recording densities and said recording condition selected for each of said recording densities.

* * * * *